(12) United States Patent
Yoshikawa et al.

(10) Patent No.: US 9,711,782 B2
(45) Date of Patent: Jul. 18, 2017

(54) POSITIVE ELECTRODE AND NONAQUEOUS ELECTROLYTE BATTERY

(71) Applicant: KABUSHIKI KAISHA TOSHIBA, Minato-ku (JP)

(72) Inventors: Hikaru Yoshikawa, Kashiwazaki (JP); Hiromichi Kuriyama, Kashiwazaki (JP); Yasuaki Murashi, Kashiwazaki (JP); Hidesato Saruwatari, Kashiwazaki (JP); Dai Yamamoto, Kashiwazaki (JP)

(73) Assignee: KABUSHIKI KAISHA TOSHIBA, Minato-ku (JP)

(*) Notice: Subject to any disclaimer, the term of this patent is extended or adjusted under 35 U.S.C. 154(b) by 295 days.

(21) Appl. No.: 14/645,867

(22) Filed: Mar. 12, 2015

(65) Prior Publication Data

US 2016/0056450 A1 Feb. 25, 2016

(30) Foreign Application Priority Data

Aug. 25, 2014 (JP) ................................. 2014-170815
Mar. 4, 2015 (JP) ................................. 2015-042835

(51) Int. Cl.
*H01M 4/58* (2010.01)
*H01M 4/131* (2010.01)
(Continued)

(52) U.S. Cl.
CPC ........ *H01M 4/131* (2013.01); *C01G 45/1242* (2013.01); *C01G 49/0072* (2013.01);
(Continued)

(58) Field of Classification Search
CPC ...... H01M 4/131; H01M 4/485; H01M 4/505; H01M 4/625; H01M 10/0525;
(Continued)

(56) References Cited

U.S. PATENT DOCUMENTS 9,406,931 B2* 8/2016 Song ................... H01M 4/131
2002/0122984 A1 9/2002 Sakai et al.
(Continued)

FOREIGN PATENT DOCUMENTS

CN 1189959 C 2/2005
CN 1595687 A 3/2005
(Continued)

OTHER PUBLICATIONS

Extended European Search Report issued Jun. 16, 2015 in Patent Application No. 15158789.6.
(Continued)

*Primary Examiner* — Raymond Alejandro
(74) *Attorney, Agent, or Firm* — Oblon, McClelland, Maier & Neustadt, L.L.P.

(57) ABSTRACT

According to one embodiment, there is provided a positive electrode including a positive electrode active material-including layer including a positive electrode active material, which includes a lithium-manganese oxide $LiMn_{2-x}M_xO_4$, and a conductive agent. In the positive electrode active material-including layer, an average particle diameter $d_{50}$ is within 2 μm to 5 μm, a particle diameter $d_{10}$ and a particle diameter $d_{90}$, where a cumulative frequency from a smaller side is, respectively, 10% and 90%, is within 0.5 μm to 3 μm and within 4 μm to 10 μm, respectively, in a particle size distribution. X, represented by $X=(d_{50}-d_{10})/d_{50}$ is within 0.4 to 0.8. Y, represented by $Y=(d_{90}-d_{50})/d_{90}$ is within 0.2 to 0.6.

10 Claims, 3 Drawing Sheets

(51) Int. Cl.
*H01M 10/0525* (2010.01)
*H01M 4/62* (2006.01)
*H01M 4/505* (2010.01)
*H01M 4/485* (2010.01)
*C01G 45/12* (2006.01)
*C01G 49/00* (2006.01)
*C01G 51/00* (2006.01)
*H01M 4/02* (2006.01)

(52) U.S. Cl.
CPC ............ *C01G 51/54* (2013.01); *H01M 4/485* (2013.01); *H01M 4/505* (2013.01); *H01M 4/625* (2013.01); *H01M 10/0525* (2013.01); *C01P 2004/51* (2013.01); *C01P 2004/61* (2013.01); *H01M 2004/021* (2013.01); *H01M 2004/028* (2013.01); *Y02E 60/122* (2013.01); *Y02T 10/7011* (2013.01)

(58) Field of Classification Search
CPC ...... H01M 2004/021; H01M 2004/028; C01G 45/1242; C01G 49/0072; C01G 51/54; Y02E 60/122; Y02T 10/7011
See application file for complete search history.

(56) References Cited

U.S. PATENT DOCUMENTS

| | | | |
|---|---|---|---|
| 2005/0019656 A1* | 1/2005 | Yoon | H01M 4/0426 429/217 |
| 2010/0285368 A1* | 11/2010 | Yamamoto | H01M 4/0421 429/231.95 |
| 2011/0136006 A1 | 6/2011 | Nogi et al. | |
| 2013/0189584 A1 | 7/2013 | Inagaki et al. | |
| 2014/0087259 A1* | 3/2014 | Li | H01M 4/366 429/221 |
| 2014/0162119 A1 | 6/2014 | Takei et al. | |
| 2014/0220416 A1 | 8/2014 | Yoshida et al. | |

FOREIGN PATENT DOCUMENTS

| | | |
|---|---|---|
| CN | 102113163 A | 6/2011 |
| CN | 103219505 A | 7/2013 |
| CN | 103872311 A | 6/2014 |
| CN | 103985838 A | 8/2014 |
| EP | 2 744 021 A1 | 6/2014 |
| EP | 2 765 634 A1 | 8/2014 |
| JP | 2001-176557 | 6/2001 |
| JP | 2009-110767 A | 5/2009 |

OTHER PUBLICATIONS

Yet-Ming Chiang, et al., "High Capacity, Temperature-Stable Lithium Aluminum Manganese Oxide Cathodes for Rechargeable Batteries", Electrochemical and Solid-State Letters, vol. 2, No. 3, XP-000864936, (1999), pp. 107-110.

Office Action mailed May 2, 2017, in Chinese Patent Application No. 201510104485.3.

K. Araki, et al. "Chemical transformation of the electrode surface of lithium-ion battery after storing at high temperature" Journal of Power Sources 124 (2003) 124-132.

* cited by examiner

POSITIVE ELECTRODE AND NONAQUEOUS ELECTROLYTE BATTERY

CROSS-REFERENCE TO RELATED APPLICATIONS

This application is based upon and claims the benefit of priority from the Japanese Patent Application NO. 2014-170815, filed Aug. 25, 2014; and No. 2015-042835, filed Mar. 4, 2015, the entire contents all of which are incorporated herein by reference.

FIELD

Embodiments described herein relate generally to a positive electrode and a nonaqueous electrolyte battery.

BACKGROUND

Lithium ion secondary batteries, which are nonaqueous electrolyte batteries, are in widespread use by introducing the batteries to electronic devices such as smartphones and laptop type personal computers, and vehicles such as hybrid cars, plug-in hybrid cars and electric cars. The lithium ion secondary battery can be manufactured, for example, by putting an electrode group, which is obtained by laminating a positive electrode and a negative electrode via a separator sandwiched in between, or by spirally winding the laminate formed in this way, in a container including aluminum or aluminum alloy as a material, and injecting an electrolyte solution, which is prepared by dissolving an electrolyte salt including lithium in a nonaqueous solvent, into the container.

DETAILED DESCRIPTION

Figure 1:
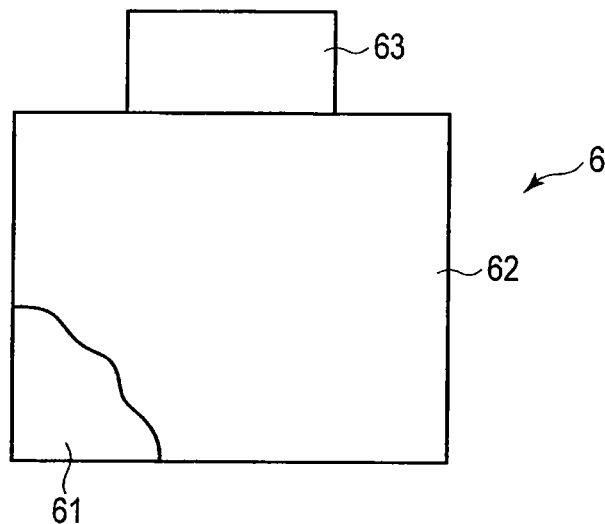
FIG. 1 is a partially cut-out schematic plan view showing one example of a positive electrode according to a first embodiment.

According to one embodiment, there is provided a positive electrode. The positive electrode includes a positive electrode current collector, and a positive electrode active material-including layer formed on the positive electrode current collector. The positive electrode active material-including layer includes a positive electrode active material and a conductive agent. The positive electrode active material includes a lithium-manganese oxide represented by $LiMn_{2-x}M_xO_4$. Here, the subscript x is within a range of $0.22 \leq x \leq 0.7$. M is at least one metal element selected from a group consisting of Mg, Ti, Cr, Fe, Co, Zn, Al, and Ga. In the positive electrode active material-including layer, an average particle diameter $d_{50}$ is within a range of 2 µm to 5 µm in a particle size distribution obtained by a laser diffraction scattering method. In addition, in the particle size distribution, a particle diameter $d_{10}$, at which a cumulative frequency from a small particle diameter side is 10%, is within a range of 0.5 µm to 3 µm. Further, in the particle size distribution of the positive electrode active material-including layer, a particle diameter $d_{90}$, at which the cumulative frequency from the small particle diameter side is 90%, is within a range of 4 µm to 10 µm. X, represented by $X=(d_{50}-d_{10})/d_{50}$ is within a range of 0.4 to 0.8. Y, represented by $Y=(d_{90}-d_{50})/d_{90}$ is within a range of 0.2 to 0.6.

Alternatively, according to one embodiment, there is provided a positive electrode. The positive electrode includes a positive electrode current collector, and a positive electrode active material-including layer formed on the positive electrode current collector. The positive electrode active material-including layer includes positive electrode active material particles and conductive agent particles. The positive electrode active material includes a lithium-manganese oxide represented by $LiMn_{2-x}M_xO_4$. In the formula, subscript x is within a range of $0.22 \leq x \leq 0.7$. M is at least one metal element selected from a group consisting of Mg, Ti, Cr, Fe, Co, Zn, Al, and Ga. Particles in the positive electrode active material-including layer have an average particle diameter $d_{50}$ within a range of 2 µm to 5 µm in a particle size distribution obtained by a laser diffraction scattering method. In addition, in the particle size distribution, a particle diameter $d_{10}$, at which a cumulative frequency from a small particle diameter side is 10%, is within a range of 0.5 µm to 3 µm. Further, in the particle size distribution of the particles in the positive electrode active material-including layer, a particle diameter $d_{90}$, at which the cumulative frequency from the small particle diameter side is 90%, is within a range of 4 µm to 10 µm. X, represented by $X=(d_{50}-d_{10})/d_{50}$, is within a range of 0.4 to 0.8. Y, represented by $Y=(d_{90}-d_{50})/d_{90}$, is within a range of 0.2 to 0.6.

According to one embodiment, there is provided a nonaqueous electrolyte battery. The nonaqueous electrolyte battery includes a positive electrode according to the first embodiment, a negative electrode, and a nonaqueous electrolyte.

The embodiments will be explained below with reference to the drawings. In this case, the structures common to all embodiments are represented by the same symbols and duplicated explanations will be omitted. Also, each drawing is a typical view for explaining the embodiments and for promoting the understanding of the embodiments. Though there are parts different from an actual device in shape, dimension and ratio, these structural designs may be appropriately changed by taking the following explanations and known technologies into consideration.

First Embodiment

According to a first embodiment, a positive electrode is provided. The positive electrode includes a positive electrode current collector, and a positive electrode active material-including layer formed on the positive electrode current collector. The positive electrode active material-including layer includes a positive electrode active material and a conductive agent. The positive electrode active material includes a lithium-manganese oxide represented by $LiMn_{2-x}M_xO_4$. Here, subscript x is within a range of $0.22 \leq x \leq 0.7$. M is at least one metal element selected from a group consisting of Mg, Ti, Cr, Fe, Co, Zn, Al, and Ga. In the positive electrode active material-including layer, an average particle diameter $d_{50}$ is within a range of 2 µm to 5 µm in a particle size distribution obtained by a laser diffraction scattering method. In addition, in the particle size distribution, a particle diameter $d_{10}$, at which a cumulative frequency from a small particle diameter side is 10%, is within a range of 0.5 µm to 3 µm. Further, in the particle size distribution, a particle diameter $d_{90}$, at which the cumulative frequency from the small particle diameter side is 90%, is within a range of 4 µm to 10 µm. X, represented by $X=(d_{50}-d_{10})/d_{50}$, is within a range of 0.4 to 0.8. Y, represented by $Y=(d_{90}-d_{50})/d_{90}$, is within a range of 0.2 to 0.6.

Here, the particle size distribution of the positive electrode active material-including layer, obtained by the laser diffraction scattering method, is a particle size distribution of particles in the positive electrode active material-including layer, obtained by the laser diffraction scattering method. The particles in the positive electrode active material-including layer include positive electrode active material particles and conductive agent particles.

Nonaqueous electrolyte batteries are desired to satisfy output characteristics in which the battery can be used at a high current value, lifetime characteristics in which the battery can be used for a long period of time, and high capacity characteristics in which the battery has a high energy density.

As one of measures to improve output characteristics, that is, to increase the output of the battery, a lithium-manganese oxide having a small particle diameter is used as a positive electrode active material. The lithium-manganese oxide having a small particle diameter, however, has a large specific surface area, and therefore a contact area with an electrolyte solution is large. For that reason, the use of such a positive electrode active material has a drawback in that an elution reaction of manganese atoms occurs easily, and thereby, the capacity may be reduced upon repetition of cycles.

On the other hand, the output can be increased by reducing an electrode density and increasing a pore size in an electrode active material layer. In that case, however, there is a drawback in that an energy density is reduced.

The positive electrode according to the first embodiment includes a lithium-manganese oxide represented by $LiMn_{2-x}M_xO_4$. In the lithium-manganese oxide represented by $LiMn_{2-x}M_xO_4$, a part of Mn atoms in the lithium-manganese oxide are substituted by at least one metal element M selected from the group consisting of Mg, Ti, Cr, Fe, Co, Zn, Al, and Ga. A substitution amount is represented by subscript x, which is within a range of $0.22 \leq x \leq 0.70$. The crystal structure of the lithium-manganese oxide is stabilized due to the metal element M being disposed in the crystal structure thereof. Accordingly, a crystal structure change in the lithium-manganese oxide, caused by insertion and release of lithium ions accompanied by charge and discharge, can be reduced. Owing to the stabilization, a nonaqueous electrolyte battery capable of showing good charge and discharge cycle characteristics can be realized, when the lithium-manganese oxide is used as the positive electrode active material. In addition, a lattice constant of the crystal structure is decreased by the metal element M substitution, and thus an acceptance property of lithium ions during large current discharge can be improved. As a result, high output characteristics can be exhibited.

In the positive electrode according to the first embodiment, since the particle size distribution of the positive electrode active material-including layer, obtained by the laser diffraction scattering method, satisfies the conditions described above, more favorable charge and discharge cycle characteristics can be exhibited, and high output characteristics can be maintained for a longer period of time, due to the following reasons.

The average particle diameter $d_{50}$ within a range of 2 µm to 5 µm in the particle size distribution mainly reflects a particle diameter of the lithium-manganese oxide included in the positive electrode active material-including layer. The average particle diameter $d_{50}$ is also influenced by the amount of the lithium-manganese oxide included in the positive electrode active material-including layer. Therefore, regarding the positive electrode active material-including layer, the average particle diameter $d_{50}$ becomes larger with increase of the included amount of the lithium-manganese oxide in the positive electrode active material-including layer. Regarding the positive electrode active material-including layer, the average particle diameter $d_{50}$ becomes smaller with decrease of the included amount of the lithium-manganese oxide.

In addition, the particle diameter $d_{10}$ within a range of 0.5 µm to 3 µm in the particle size distribution mainly reflects a particle diameter of a conductive agent, which has a small particle diameter, included in the positive electrode active material-including layer. The particle diameter $d_{10}$ is also influenced by the amount of the conductive agent, which has a small particle diameter, included in the positive electrode active material-including layer.

The particle diameter $d_{90}$ within a range of 4 µm to 10 µm in the particle size distribution mainly reflects a particle diameter of the lithium-manganese oxide included in the positive electrode active material-including layer. The particle diameter $d_{90}$ is also influenced by the amount of the lithium-manganese oxide included in the positive electrode active material-including layer.

X, which is from 0.4 to 0.8, is a value obtained by dividing a difference between the average particle diameter $d_{50}$ and the particle diameter $d_{10}$ by the average particle diameter $d_{50}$, in the particle size distribution regarding the positive electrode active material-including layer, as shown in the equation: $X=(d_{50}-d_{10})/d_{50}$. Accordingly, X mainly reflects the particle diameter of the conductive agent included in the positive electrode active material-including layer and the lithium-manganese oxide included in the positive electrode active material-including layer. In addition, X is influenced by the amount of the lithium-manganese oxide and the conductive agent included in the positive electrode active material-including layer.

Y, which is from 0.2 to 0.6, is a value obtained by dividing a difference between the particle diameter $d_{90}$ and the average particle diameter $d_{50}$ by the particle diameter $d_{90}$, in the particle size distribution regarding the positive electrode active material-including layer, as shown in the equation: $Y=(d_{90}-d_{50})/d_{90}$. Accordingly, Y mainly reflects the particle diameter of the lithium-manganese oxide. In addition, Y is influenced by the amount of the lithium-manganese oxide included in the positive electrode active material-including layer.

Since the particle size distribution of the positive electrode active material-including layer in the positive electrode according to the first embodiment satisfies the conditions described above, almost all of the peaks appearing in the particle size distribution can be considered to be derived from the positive electrode active material, and the conductive agent, which has a particle diameter smaller than that of the positive electrode active material, may be included in a small amount. Specifically, the amount of the positive electrode active material included in the positive electrode active material-including layer in the positive electrode according to the first embodiment may be adjusted to 91% or more relative to the weight of the positive electrode active material-including layer.

The positive electrode active material-including layer having such a particle size distribution, particularly the particle size distribution in which the average particle diameter $d_{50}$ is from 2 µm to 5 µm, may include positive electrode active material particles which can exhibit high density, and have a small pore size and large surface area. According to the positive electrode of the first embodiment, therefore, the energy density can be improved by increasing an area that reacts during the charge and discharge reaction, while the output characteristics are maintained.

In addition, the lithium-manganese oxide, represented by $LiMn_{2-x}M_xO_4$, can suppress the elution of Mn, even if the surface area is increased.

The positive electrode according to the first embodiment, accordingly, can allow a realization of a nonaqueous electrolyte battery, which can exhibit high output while good charge and discharge cycle characteristics and good energy density are secured.

In the lithium-manganese oxide, represented by $LiMn_{2-x}M_xO_4$, x being less than 0.22 means that the number of atoms substituted is too small. When x is less than 0.22, the effect of stabilizing the structure is insufficient, the lattice constant is small, and the effect of improving cycle characteristics and output characteristics is low. On the other hand, that x is greater than 0.7 means that the number of atoms substituted is too large. When x is greater than 0.7, since the proportion of Mn in the lithium-manganese oxide is reduced, reduction in the charge-discharge capacity is incurred, and the energy density becomes low. In addition, because the included amount of the metal element M approaches the limit of solubility of the metal element M in Mn, even if the substitution is performed so that x is adjusted to more than 0.7, the effect of improving cycle characteristics and output characteristics is low. The preferable range of x is from 0.3 to 0.5.

It is preferable that the metal element M for substitution, in the lithium-manganese oxide represented by $LiMn_{2-x}M_xO_4$, includes Al. When lithium-manganese oxide that includes Al as the metal element for substitution is used, more excellent charge and discharge cycle characteristics can be exhibited.

Regarding the positive electrode active material-including layer, a value of X is of less than 0.4 means that the difference between the average particle diameter $d_{50}$ and particle diameter $d_{10}$ is too small, in the particle size distribution. The following three reasons can be considered to cause the difference between the average particle diameter $d_{50}$ and particle diameter $d_{10}$, in the particle size distribution, to be too small as such. In any case, the above described nonaqueous electrolyte battery, capable of exhibiting high output while good charge and discharge cycle characteristics and energy density are secured, cannot be realized.

First, it can be considered that a difference between the particle diameter of the conductive agent and the particle diameter of the lithium-manganese oxide is too small, that is, the particle diameter of the conductive agent is close to the particle diameter of the lithium-manganese oxide. When conductive agent particles having a particle diameter similar to that of the lithium-manganese oxide particles are used, high density cannot be achieved because the possibility of formation of spaces in between particles increases. As a result, in a nonaqueous electrolyte battery resulting therefrom, the energy density is reduced.

Secondly, it can be considered that the particle diameter of the lithium-manganese oxide is too small. Points of contact between the lithium-manganese oxide and the conductive agent decreases as the particle diameter of the lithium-manganese oxide becomes smaller, and thus a value of electrical resistance increases. The output characteristics of a nonaqueous electrolyte battery including such a lithium-manganese oxide in the positive electrode are reduced.

Finally, it can be considered that the amount of the conductive agent, which has small particles, included in the positive electrode active material-including layer, is insufficient compared with the amount of the lithium-manganese oxide. In such a case, the positive electrode active material-including layer cannot have good conductive paths, and thus output characteristics are reduced.

As described above, the positive electrode in which the value of X, regarding the positive electrode active material-including layer, is less than 0.4 cannot allow a realization of a nonaqueous electrolyte battery capable of exhibiting high output while good charge and discharge cycle characteristics and good energy density are secured.

In addition, in the positive electrode in which the value of X, regarding the positive electrode active material-including layer, is more than 0.8, the particle diameter of the conductive agent is too small compared with the particle diameter of the lithium-manganese oxide. In such a case, a ratio of contact area between the lithium-manganese oxide and the conductive agent is reduced, and thus good conductive paths are not formed, thus resulting in reduced output characteristic.

The particle diameter $d_{50}$ and the particle diameter $d_{10}$, in the particle size distribution regarding the positive electrode active material-including layer, are both positive values, and the value $d_{50}$ is always greater than the value $d_{10}$. For that reason, regarding the positive electrode active material-including layer, X cannot be a value greater than 1, and X cannot be a negative value.

Regarding the positive electrode active material-including layer, a value of Y of less than 0.2 means that the difference between the average particle diameter $d_{50}$ and particle diameter $d_{90}$ is too small, in the particle size distribution. The following three reasons can be considered to cause the difference between the average particle diameter $d_{50}$ and particle diameter $d_{90}$, in the particle size distribution, to be too small as such. In any case, the above described nonaqueous electrolyte battery, capable of exhibiting high output while good charge and discharge cycle characteristics and energy density are secured, cannot be realized.

First, the average particle diameter $d_{50}$ is greatly influenced by the lithium-manganese oxide, as explained above. However, $d_{50}$ is also greatly influenced by the conductive agent when the particle diameter of the lithium-manganese oxide is close to the particle diameter of the conductive agent. Accordingly, Y may be influenced by the conductive agent.

Regarding the positive electrode active material-including layer, when the value of Y is less than 0.2, it can be considered that a difference between the particle diameter of the conductive agent and the particle diameter of the lithium-manganese oxide is too small; that is, the particle diameter of the conductive agent is close to the particle diameter of the lithium-manganese oxide. When the conductive agent particles having a particle diameter similar to that of the lithium-manganese oxide particles are used, high density cannot be achieved because the possibility of formation of spaces in between particles increases. As a result, in a nonaqueous electrolyte battery resulting therefrom, energy density is reduced.

Secondly, it can be considered that the particle diameter of the conductive agent is too large. The volume ratio of the lithium manganese particles decreases with an increase in particle diameter of the conductive agent. The energy density of a nonaqueous electrolyte battery including such a lithium-manganese oxide in the positive electrode is reduced.

Finally, it can be considered that the amount of the conductive agent, which has small particles, included in the positive electrode active material-including layer, is insufficient compared with the amount of the lithium-manganese oxide. In such a case, the positive electrode active material-including layer cannot have good conductive paths, and thus the output characteristics are reduced.

As described above, the positive electrode in which the value of Y, regarding the positive electrode active material-including layer, is less than 0.2 cannot allow a realization of a nonaqueous electrolyte battery capable of exhibiting high output while good charge and discharge cycle characteristics and good energy density are secured. In addition, in the positive electrode in which the value of Y, regarding the positive electrode active material-including layer, is more than 0.6, the particle diameter of the lithium-manganese oxide is too great compared with the particle diameter of the conductive agent. In such a positive electrode, good conductive paths cannot be formed. Additionally, the lithium-manganese oxide having a large particle diameter has a small specific surface area. For that reason, with such a positive electrode, a high output cannot be realized.

Regarding the positive electrode active material-including layer, the particle diameter $d_{50}$ and the particle diameter $d_{90}$ in the particle size distribution are both positive values, and the value $d_{50}$ is always less than the value $d_{90}$. For that reason, regarding the positive electrode active material-including layer, Y cannot be a value greater than 1, and Y cannot be a negative value.

In the positive electrode active material-including layer in which the particle diameter $d_{10}$ in the particle size distribution is more than 3 μm, it can be considered that the particle diameter of the conductive agent is too large, or the conductive agent particles are insufficiently dispersed and are aggregated in the positive electrode active material-including layer. A nonaqueous electrolyte battery using such a positive electrode cannot have good conductive paths, obtainable by the conductive agent, which has small particles.

On the other hand, in the positive electrode active material-including layer in which the particle diameter $d_{10}$ in the particle size distribution is less than 0.5 μm, the surface areas of both the conductive agent and the active material are large. For that reason, in the positive electrode active material-including layer, reactivity of the conductive agent and active material increases for a side-reaction with the non-aqueous solvent and electrolyte. Thus the charge-discharge capacity may be reduced when cycles are repeated.

In the positive electrode active material-including layer in which the average particle diameter $d_{50}$ in the particle size distribution is more than 5 μm, it can be considered that the particle size of the lithium-manganese oxide is too large, or the lithium-manganese oxide particles are insufficiently dispersed and are aggregated in the positive electrode active material-including layer. Such a nonaqueous electrolyte battery cannot have good conductive paths because the difference in the particle diameter between the lithium-manganese oxide and the conductive agent is too large.

On the other hand, in the positive electrode active material-including layer in which the average particle diameter $d_{50}$ in the particle size distribution is less than 2 μm, the particles of the lithium-manganese oxide are too small and reactivity of a side-reaction increases, and thus, may result in reduction of charge-discharge capacity when the cycle is repeated.

In the positive electrode active material-including layer in which the particle diameter $d_{90}$ in the particle size distribution is more than 10 μm, it can be considered that the particle diameter of the lithium-manganese oxide is too large, or the lithium-manganese oxide is insufficiently dispersed and aggregated in the positive electrode active material-including layer. In such a case, the surface area of the lithium-manganese oxide can be considered to become smaller. In a nonaqueous electrolyte battery using such a positive electrode, the surface area of pores in the positive electrode active material-including layer becomes smaller, and the output characteristics are reduced.

In the positive electrode active material-including layer in which the particle diameter $d_{90}$ in the particle size distribution is less than 4 μm, it can be considered that the difference in the particle diameter between the conductive agent and the active material is too small. In a nonaqueous electrolyte battery using such a positive electrode, it is difficult to increase the density of the positive electrode active material-including layer, and the energy density is reduced.

The positive electrode active material included in the positive electrode active material-including layer may be the lithium-manganese oxide alone, or may include a lithium-nickel composite oxide or a lithium-cobalt oxide in addition thereto.

The conductive agent included in the positive electrode active material-including layer preferably includes a carbon material. The conductive agent including the carbon material can provide more excellent conductive paths.

It is preferable that in a pore size distribution of the positive electrode active material-including layer, obtained by a mercury intrusion method, a median diameter $D_{me}$ is within a range of 0.15 μm to less than 0.4 μm, and a mode diameter $D_{mo}$ is within a range of 0.15 μm to less than 0.4 μm. In the positive electrode according to the first embodiment wherein the positive electrode active material-including layer has such a pore size distribution, the pore size, that is, the spaces in the positive electrode active material-including layer are small, and thus the density can be increased. As a result, the energy density can be increased.

In the positive electrode according to the first embodiment, even if a proportion or a density of a sub-member is adjusted over a wide range, the positive electrode can have the pore size distribution described above.

The positive electrode active material-including layer preferably has a density within a range of 2.8 g/cm$^3$ to 3.5 g/cm$^3$. In the positive electrode according to the first embodiment in which the positive electrode active material-including layer has a density within the range described above, more favorable charge-discharge paths can be formed, and reactivity of side-reactions of the lithium-manganese oxide can be further inhibited. The positive electrode according to the first embodiment, in which the positive electrode active material-including layer has a density within the range described above, can exhibit excellent energy density property. Further, when the positive electrode according to the first embodiment, in which the positive electrode active material-including layer has a density within the range described above, is used in the nonaqueous electrolyte battery, uneven impregnation of the nonaqueous electrolyte in the positive electrode active material-including layer can be suppressed. When impregnation of the nonaqueous electrolyte in the positive electrode active material-including layer becomes uneven, applied voltage in the positive electrode active material-including layer becomes uneven. At a portion to which a voltage is applied that is higher than those applied to other portions in the positive electrode active material-including layer, side-reactions, in particular decomposition of the nonaqueous electrolyte, may be promoted. The positive electrode active material-including layer more preferably has a density within a range of 2.8 $g/cm^3$ to 3.1 $g/cm^3$.

The density of the positive electrode active material-including layer can be measured as follows: First, a weight of the positive electrode and a volume of the positive electrode are measured. Then, the positive electrode active material-including layer is peeled off from the positive electrode to obtain the positive electrode current collector alone. A weight and a volume of the positive electrode current collector are measured. Differences in the weight and volume between the positive electrode and the positive electrode current collector correspond to a weight and a volume of the positive electrode active material-including layer. A density of the positive electrode active material-including layer can be calculated by dividing the resulting weight by the resulting volume.

The amount of the of the positive electrode active material included in the positive electrode active material-including layer is preferably from 91% to 96% relative to the weight of the positive electrode active material-including layer. The positive electrode in which the included amount of the positive electrode active material is within the range described above can attain excellent energy density, reduced electric resistance, and excellent electrode strength, and productivity of the positive electrode is also excellent.

Next, one example of procedures in which the particle size distribution of the positive electrode active material-including layer is obtained according to the laser diffraction scattering method, and one example of procedures in which the pore size distribution of the positive electrode active material-including layer is obtained according to a mercury intrusion method are explained.

(1) One Example of Procedures in which Particle Size Distribution of Positive Electrode Active Material-Including Layer is Obtained According to Laser Diffraction Scattering Method 1. Disassembly of Nonaqueous Electrolyte Battery First, gloves are worn as a prior preparation, in order to avoid direct contact of an electrode and nonaqueous electrolyte.

Next, in order to prevent the constituent elements of the battery from reacting with atmospheric components or moisture during the disassembly, the nonaqueous electrolyte battery is put in a glove box with an argon atmosphere.

The nonaqueous electrolyte battery is opened in the glove box. For example, heat-sealed portions around a positive electrode tab and a negative electrode tab are cut, whereby the nonaqueous electrolyte battery can be cut open.

An electrode group is taken out from the nonaqueous electrolyte battery, which has been cut open. When the thus taken out electrode group includes a positive electrode lead and a negative electrode lead, the positive electrode lead and the negative electrode lead are cut off, taking precautions as not to short-circuit the positive and negative electrodes.

Next, the electrode group is disassembled into the positive electrode, the negative electrode, and a separator. The thus obtained positive electrode is washed with ethylmethyl carbonate as a solvent.

After washing, the positive electrode is subjected to drying under vacuum. Alternatively, the positive electrode may be subjected to natural drying under an argon atmosphere.

2. Measurement of Particle Size Distribution

A positive electrode active material-including layer is peeled off from the dried positive electrode using, for example, a spatula.

The peeled positive electrode active material-including layer sample, which is in powder form, is added into a measurement cell, which is filled with N-methyl-2-pyrrolidone, up to a measurable concentration. A capacity of the measurement cell and a measurable concentration vary depending on the particle size distribution-measuring apparatus.

To the measurement cell including N-methyl-2-pyrrolidone and the positive electrode active material-including layer sample dissolved therein, ultrasonic waves are irradiated for 5 minutes. The output of the ultrasonic waves is adjusted to a range of, for example, 35 W to 45 W. For example, when N-methyl-2-pyrrolidone is used as the solvent in an amount of about 50 ml, the solvent mixed with the measurement sample is irradiated with ultrasonic waves at an output of about 40 W for 300 seconds. When irradiation using ultrasonic waves is applied, as such, aggregations of the conductive agent particles and the active material particles can be dissociated.

The measurement cell, which has been treated with ultrasonic waves, is loaded into a particle size distribution-measuring apparatus, which uses the laser diffraction scattering method, and the particle size distribution is measured. Examples of the particle size distribution-measuring apparatus may include Microtrac 3100, and Microtrac 3000 II.

Thus, the particle size distribution of the positive electrode active material-including layer can be obtained.

(2) One Example of Procedures in which Pore Size Distribution of Positive Electrode Active Material-including Layer is Obtained According to Mercury Intrusion Method The dried positive electrode, which is obtained in the measurement of the particle size distribution, may be used as a sample. As the pore distribution-measuring apparatus, for example, Shimadzu Autopore 9520 can be used. When the measurement is performed, one sample described above is cut into a size of about 25 mm-width, which is folded and put in a standard cell, and the cell is inserted into a measuring chamber. The measurement is performed at conditions of an initial pressure of 20 kPa (about 3 psia, corresponding to a pore diameter of about 60 μm) and a final pressure of 414000 kPa (about 60000 psia, corresponding to a pore diameter of about 0.003 μm).

The pore size distribution obtained according to a mercury intrusion method reflects not only the pore size of the positive electrode active material-including layer, but also the pore size of the positive electrode current collector. The pore size of the current collector, however, is sufficiently smaller than that of the positive electrode active material-including layer, and the proportion of the pores of the current collector that exist is low. Thus the pore size of the current collector can be ignored.

Next, the positive electrode according to the first embodiment is explained in more detail.

The positive electrode includes a positive electrode current collector, and a positive electrode active material-including layer formed on the positive electrode current collector.

The positive electrode current collector may include a portion where the positive electrode active material-including layer is not formed on its surface, and the portion can function as a positive electrode lead.

As the positive electrode current collector, a foil of a metal such as aluminum or copper may be used.

The positive electrode active material-including layer includes at least one lithium-manganese oxide, represented by $LiMn_{2-x}M_xO_4$, and a conductive agent. The positive electrode active material-including layer may include an active material other than the lithium-manganese oxide. The other active material, which may be included in the positive electrode active material-including layer, may include, for example, a lithium-nickel composite oxide and a lithium-cobalt oxide.

The conductive agent, included in the positive electrode active material-including layer, preferably includes a carbon material, as explained above. The carbon material may include, for example, acetylene black, Ketjen black, furnace black, graphite, carbon nanotube, and the like. The positive electrode active material-including layer may include one of or two or more of the above carbon materials, or may further include another conductive agent.

The positive electrode active material-including layer may further include a binder. The binder, which may be included in the positive electrode active material-including layer, is not particularly limited. For example, a polymer, which sufficiently disperses in a solvent used for mixing in slurry preparation, may be used as the binder. Such a polymer may include, for example, polyvinylidene fluoride, hexafluoropropylene, polytetrafluoroethylene, and the like.

The positive electrode can be manufactured, for example, by the following method. First, at least one lithium-manganese oxide, another active material of choice, a conductive agent, and a binder of choice are added into an appropriate solvent to obtain a mixture. Subsequently, the obtained mixture is put into a stirrer. The mixture is stirred in the stirrer to obtain slurry. The thus obtained slurry is applied onto the positive electrode current collector to obtain an applied coat, which is dried. Then, the applied coat on the positive electrode current collector is pressed, whereby a positive electrode can be manufactured. The particle size distribution of the positive electrode active material-including layer can be adjusted to the above described conditions by controlling, for example, stirring conditions of the mixture, the particle diameter of the lithium-manganese oxide, and the like. The particle diameter of the lithium-manganese oxide can be controlled by control of sintering conditions, control of a diameter of a precursor, classification after sintering, and the like.

A level of aggregation between the lithium-nickel composite oxide particles and a level of aggregation between the particles of the conductive agent in the slurry obtained as above are reflected in the particle size distribution of the positive electrode active material-including layer obtained by the method explained above.

Next, the positive electrode according to the first embodiment is explained in more detail, referring to the drawings.

FIG. 1 is a partially cut-out schematic plan view showing one example of positive electrodes according to the first embodiment.

A positive electrode 6, shown in FIG. 1, includes a positive electrode current collector 61, and positive electrode active material-including layers 62 formed on both sides of the positive electrode current collector 61. As shown in FIG. 1, the positive electrode current collector 61 includes a portion 63 where the positive electrode active material-including layer 62 is not formed on a surface thereof, and the portion 63 functions as a positive electrode lead. As shown in FIG. 1, the positive electrode lead 63 is a narrow portion whose width is narrower than that of the positive electrode active material-including layer 62.

The positive electrode according to the first embodiment includes the lithium-manganese oxide represented by $LiMn_{2-x}M_xO_4$. In the particle size distribution of the positive electrode, obtained by the laser diffraction scattering method, the average particle diameter $d_{50}$ is within a range of 2 µm to 5 µm, the particle diameter $d_{10}$ is within a range of 0.5 µm to 3 µm, and the particle diameter $d_{90}$ is within a range of 4 µm to 10 µm. In the positive electrode, X, represented by $X=(d_{50}-d_{10})/d_{50}$, is within a range of 0.4 to 0.8, and Y, represented by $Y=(d_{90}-d_{50})/d_{90}$, is within a range of 0.2 to 0.6. Owing to the above, the positive electrode according to the first embodiment can allow the realization of the nonaqueous electrolyte battery capable of exhibiting high output while excellent charge and discharge cycle characteristics and excellent energy density are secured.

Second Embodiment

According to a second embodiment, a nonaqueous electrolyte battery is provided. The nonaqueous electrolyte battery includes the positive electrode according to the first embodiment, a negative electrode, and a nonaqueous electrolyte.

Next, the nonaqueous electrolyte battery according to the second embodiment is explained in more detail.

The nonaqueous electrolyte battery according to the second embodiment includes a positive electrode, a negative electrode, and a nonaqueous electrolyte. The positive electrode is the positive electrode according to the first embodiment.

The negative electrode may include a negative electrode current collector, and a negative electrode active material-including layer formed on the negative electrode current collector. The negative electrode current collector may include a portion where the negative electrode active material-including layer is not formed on its surface. The portion can function as a negative electrode lead.

As the negative electrode current collector, a foil of a metal such as aluminum or copper may be used.

The negative electrode active material-including layer may include, for example, a negative electrode active material, a conductive agent, and a binder.

The negative electrode active material, which may be included in the negative electrode active material-including layer, is not particularly limited. The negative electrode active material may include, for example, a graphite material or carbonaceous material (for example, graphite, coke, carbon fiber, spherical carbon, carbonaceous material obtained by the pyrolytic of the gaseous carbonaceous substance, resin baked material and the like), chalcogen compound (for example, titanium disulfide, molybdenum disulfide, niobium selenide and the like), and light metal (for example, aluminum, aluminum alloy, magnesium alloy, lithium, lithium alloy and the like), oxides of titanium (such as spinel-type lithium titanate), and the like.

The negative electrode active material preferably includes an oxide of titanium having a lithium insertion and release voltage of 1.5 V (vs. $Li/Li^+$) or more. Such an oxide of titanium may include, for example, spinel type lithium titanate $Li_4Ti_5O_{12}$, monoclinic crystal titanium dioxide $TiO_2$ (B), and niobium-titanium composite oxides. When such a negative electrode including the oxide of titanium having a high action potential is used, the elution of Mn from the lithium-manganese oxide of the positive electrode can be further suppressed.

The negative electrode active material more preferably includes the spinel type lithium titanate $Li_4Ti_5O_{12}$. The negative electrode including the spinel type lithium titanate $Li_4Ti_5O_{12}$ can allow a realization of the nonaqueous electrolyte battery capable of showing excellent charge and discharge cycle characteristics. Accordingly, the nonaqueous electrolyte battery according to the second embodiment, which includes the negative electrode including the spinel type lithium titanate $Li_4Ti_5O_{12}$, can exhibit more excellent charge and discharge cycle characteristics.

As the conductive agent and the binder, which may be included in the negative electrode active material-including layer, the same conductive agents and the binders as that included in the positive electrode active material-including layer may be used.

The density of the negative electrode active material-including layer can be obtained in the same manner as in the method to obtain the density of the positive electrode active material-including layer.

The negative electrode can be manufactured, for example, by the following procedures. First, a negative electrode active material, a conductive agent, and a binder are mixed. The thus obtained mixture is added into a solvent to prepare a slurry. The slurry is applied onto the negative electrode current collector to form an applied coat, which is dried. Then the applied coat on the negative electrode current collector is pressed, whereby a negative electrode can be manufactured.

An electrode group can be formed from the positive electrode and the negative electrode by facing the positive electrode active material-including layer to the negative electrode active material-including layer through a separator which is sandwiched in between. The separator is not particularly limited, and for example a fine porous film, a woven fabric, a non-woven fabric, or a laminate thereof having the same material or different materials may be used. The material forming the separator may include polyethylene, polypropylene, ethylene-propylene copolymers, ethylene-butene copolymers, cellulose, and the like.

The structure of the thus formed electrode group is not particularly limited. For example, the electrode group may have a stacked structure. The stacked structure is a structure in which the positive electrode and the negative electrode described above, and the separator, which is sandwiched in between, are stacked. Alternatively, the electrode group may have a coiled structure. The coiled structure is a structure in which the positive electrode and the negative electrode described above, and the separator, which is sandwiched in between, are stacked and the thus obtained stack is spirally wound.

The nonaqueous electrolyte may be impregnated into, for example, the electrode group.

The nonaqueous electrolyte may be prepared by dissolving an electrolyte (such as lithium salts) in a nonaqueous solvent.

The nonaqueous solvent may include, for example, ethylene carbonate (EC), propylene carbonate (PC), butylene carbonate (BC), dimethyl carbonate (DMC), diethyl carbonate (DEC), ethylmethyl carbonate (EMC), γ-butyrolactone (γ-BL), sulfolane, acetonitrile, 1,2-dimethoxyethane, 1,3-dimethoxypropane, dimethyl ether, tetrahydrofuran (THF), 2-methyl tetrahydrofuran, and the like. The nonaqueous solvent may be used alone, or as a mixture of two or more kinds.

The electrolyte may include, for example, lithium salts such as lithium perchlorate ($LiClO_4$), lithium hexafluorophosphate ($LiPF_6$), lithium tetrafluoroborate ($LiBF_4$), lithium hexafluoroarsenate ($LiAsF_6$), and lithium trifluoromethanesulfonate ($LiCF_3SO_3$). The electrolyte may be used alone, or as a mixture of two or more kinds.

It is desirable to adjust the amount of the electrolyte dissolved in the nonaqueous solvent to 0.5 mol/L to 3 mol/L. When the concentration of the electrolyte is too low, sufficient ion-conductivity may not be obtained in some cases. On the other hand, when it is too high, the electrolyte solution may not be completely dissolved in the solvent in some cases.

The nonaqueous electrolyte battery according to the embodiment may further include a container for housing the electrode group and the nonaqueous electrolyte described above.

For the container, for example, aluminum (Al), aluminum alloy, iron (Fe), aluminum-including laminate films, nickel (Ni)-plated iron, stainless steel (SUS), and the like may be used.

The nonaqueous electrolyte battery according to the embodiment may further include a positive electrode tab, which is electrically connected to the positive electrode lead, and a negative electrode tab, which is electrically connected to the negative electrode lead. The positive electrode tab and the negative electrode tab can also function as a positive electrode terminal and a negative electrode terminal, in a state in which they are pulled out from the container. Alternatively, the positive electrode tab and the negative electrode tab may also be connected to the positive electrode terminal and the negative electrode terminal, respectively.

It is desirable that the positive electrode tab, the negative electrode tab, the positive electrode terminal, and the negative electrode terminal are formed from, for example, aluminum or an aluminum alloy.

Figure 2:
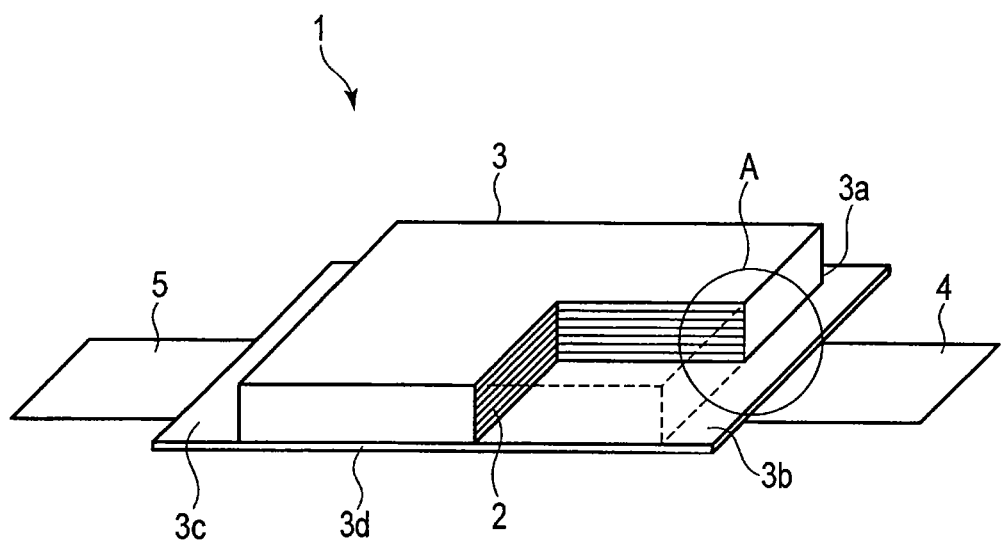
FIG. 2 is a cut-out schematic perspective view showing one example of a nonaqueous electrolyte battery according to a second embodiment.
Figure 3:
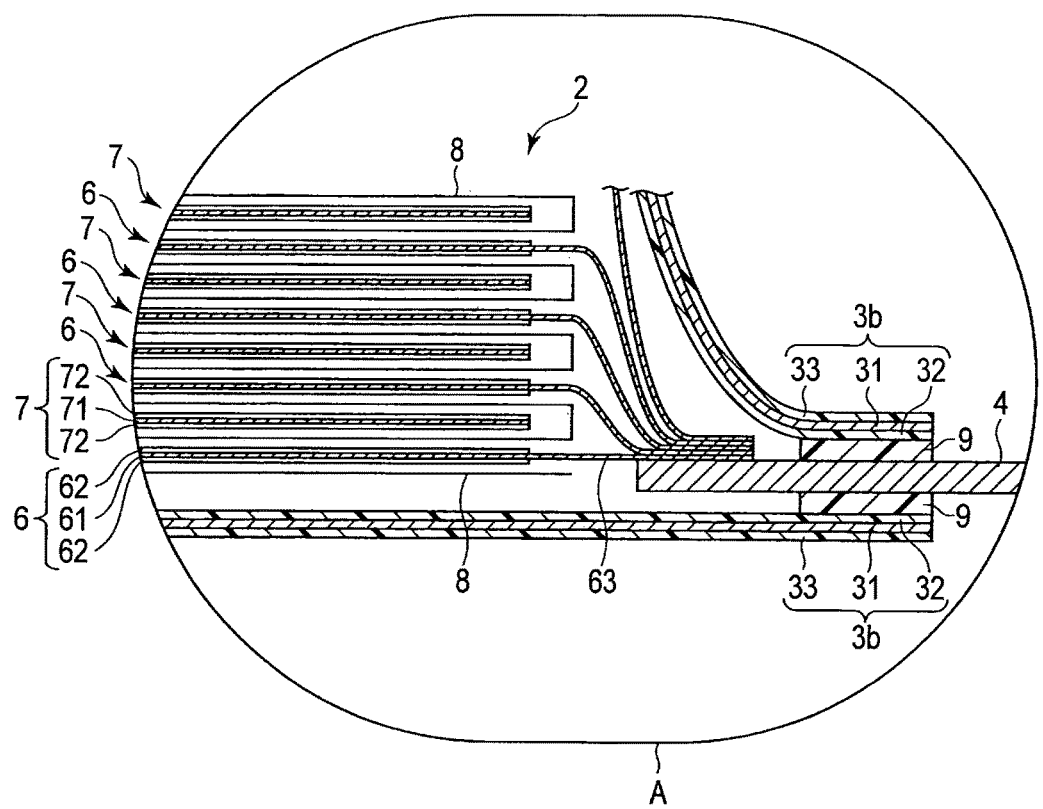
FIG. 3 is a schematic cross-sectional view of part A in FIG. 2.

Next, one example of the nonaqueous electrolyte batteries according to the embodiment is explained in more detail, referring to FIGS. 2 and 3.

FIG. 2 is a cut-out schematic perspective view showing one example of the nonaqueous electrolyte batteries according to the embodiment. FIG. 3 is a schematic cross-sectional view of part A shown in FIG. 2.

A nonaqueous electrolyte battery 1 of a first example, shown in FIGS. 2 and 3, includes an electrode group 2, shown in FIGS. 2 and 3, a container 3, shown in FIGS. 2 and 3, a positive electrode tab 4, shown in FIGS. 2 and 3, and a negative electrode tab 5, shown in FIG. 2.

The electrode group 2, shown in FIGS. 2 and 3, includes a plurality of positive electrodes 6, a plurality of negative electrode 7, and one separator 8.

The positive electrode 6 has the structure explained above with reference to FIG. 1.

The negative electrode 7 includes a negative electrode current collector 71, and negative electrode active material-including layers 72 formed on both sides of the negative electrode current collector 71, as shown in FIG. 3. Although not shown, the negative electrode current collector 71 also includes a portion where the negative electrode active material-including layer 72 is not formed on a surface, and the portion functions as the negative electrode lead.

As shown in FIG. 3, the separator 8 is folded in zigzag. In each of spaces defined by surfaces facing each other of the separator 8 folded in zigzag, either of the positive electrode 6 or the negative electrode 7 is disposed. Accordingly, the positive electrode 6 and the negative electrode 7 are stacked so that the positive electrode active material-including layer 62 and the negative electrode active material-including layer 72 face each other through the separator 8 sandwiched in between, as shown in FIG. 3. Thus, the electrode group 2 is formed.

The positive electrode leads 63 of the electrode group 2 extend out from the electrode group 2, as shown in FIG. 3. The positive electrode leads 63 are, as shown in FIG. 3, collected into one, which is connected to the positive electrode tab 4. Although not shown, the negative electrode lead of the electrode group 2 also extends out from the electrode group 2. Although not shown, the negative electrode leads are collected into one, which is connected to the negative electrode tab 5 shown in FIG. 2.

Such an electrode group 2 is housed in a container 3, as shown in FIGS. 2 and 3.

The container 3 is formed of an aluminum-including laminate film including an aluminum foil 31 and resin films 32 and 33 formed on the both sides thereof. The aluminum-including laminate film, forming the container 3, is folded with a bent portion 3*d* being a fold so that the resin film 32 faces inward, and houses the electrode group 2. The container 3 holds the positive electrode tab 4 at the periphery 3*b* thereof, as shown in FIGS. 2 and 3. Similarly, the container 3 holds the negative electrode tab 5 at the periphery 3*c* thereof. By this structure, the positive electrode tab 4 and the negative electrode tab 5 extend out from the container 3 in opposite directions to each other.

In the container 3, the peripheries 3*a*, 3*b* and 3*c* are heat-sealed by thermal fusion of the resin films 32 facing each other, except at portions where the positive electrode tab 4 and the negative electrode tab 5 are held.

In the nonaqueous electrolyte battery 1, in order to improve bonding strength between the positive electrode tab 4 and the resin film 32, insulating films 9 are provided between the positive electrode tab 4 and the resin films 32, as shown in FIG. 3. In the periphery 3*b*, positive electrode tab 4 and the insulating film 9 are heat-sealed by thermal fusion, and the resin film 32 and the insulating film 9 are heat-sealed by thermal fusion. Similarly, although not shown, insulating films 9 are also provided between the negative electrode tab 5 and the resin films 32. In the periphery 3*c*, the negative electrode tab 5 and the insulating film 9 are heat-sealed by thermal fusion, and the resin film 32 and the insulating film 9 are heat-sealed by thermal fusion. Accordingly, in the nonaqueous electrolyte battery 1 shown in FIGS. 2 and 3, all of the peripheries 3*a*, 3*b* and 3*c* of the container 3 are heat-sealed.

The container 3 further houses a nonaqueous electrolyte, which is not shown. The electrode group 2 is impregnated with the nonaqueous electrolyte.

Figure 4:
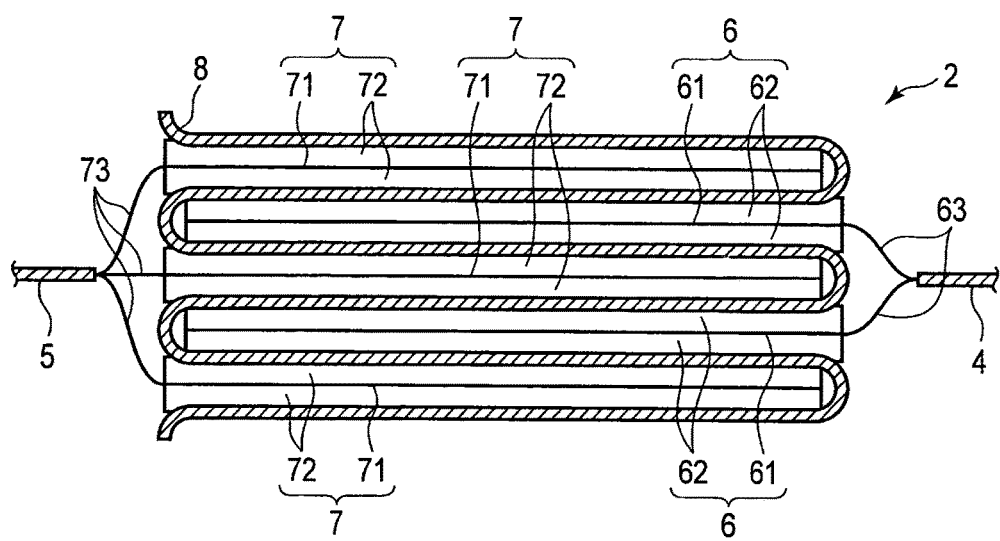
FIG. 4 is a schematic cross-sectional view showing one example of an electrode group, which may be included in a nonaqueous electrolyte battery according to the second embodiment.

In the nonaqueous electrolyte battery 1 shown in FIGS. 2 and 3, the multiple positive electrode leads 63 are collected at the undermost layer of the electrode group 2, as shown in FIG. 2. Similarly, although not shown, the multiple negative electrode leads are collected at the undermost layer of the electrode group 2. Each of the multiple positive electrode leads 63 and the multiple negative electrode leads 73 may, however, be collected to one near a middle of the electrode group 2, and connected to the positive electrode tab 4 and the negative electrode tab 5, respectively, as shown in FIG. 4, for example.

The nonaqueous electrolyte battery according to the second embodiment includes the positive electrode according to the first embodiment, and thus can exhibit high output while good charge and discharge cycle characteristics and good energy density are secured.

EXAMPLE

Examples are explained below.

Example 1

In Example 1, a nonaqueous electrolyte battery 1 of Example 1, which is similar to that shown in FIGS. 2 and 3, was manufactured by the following procedures.

[Manufacture of Positive Electrode 6]

As the positive electrode active material, an Al-substituted lithium-manganese oxide $LiMn_{1.7}Al_{0.3}O_4$ having an average particle diameter of 5.6 μm was used. The active material, acetylene black, graphite, and polyvinylidene fluoride were mixed in a weight ratio of 100:4:1:4 by the following procedures. First, the active material, acetylene black, and graphite were dry-mixed using a Henschel mixer. After dry-mixing, polyvinylidene fluoride and N-methyl-2-pyrrolidone were added into the obtained dry mixture, and the resulting mixture is wet-mixed using a planetary mixer. As described above, the mixture including the materials in the above described ratio was manufactured.

Here, in a particle size distribution of the positive electrode active material in a solitary state before mixing, the particle diameters $d_{10}$, $d_{50}$, and $d_{90}$ were, respectively, 4.4 μm, 5.6 μm, and 7.6 μm. In a particle size distribution of the acetylene black in a solitary state before mixing, the particle diameters $d_{10}$, $d_{50}$, and $d_{90}$ were, respectively, 0.2 μm, 0.7 μm, and 3.3 μm. In a particle size distribution of the graphite, in a solitary state before mixing the particle diameters $d_{10}$, $d_{50}$, and $d_{90}$ were, respectively, 2.5 μm, 3.9 μm, and 6.1 μm.

Subsequently, the manufactured mixture was put into a THINKY ARE-250 mixer (Japanese Name: Rentaro), which is a planetary centrifugal mixer manufactured by THINKY, and stirred at 2000 rpm for 30 minutes.

A positive electrode slurry, obtained after the stirring, was applied onto both sides of an aluminum foil as a positive electrode current collector 61 having a thickness of 20 μm using a coating apparatus, such that an applied amount per unit area would be 50 g/m². At that time, a portion 63 was left on the aluminum foil, where the slurry was not applied. After the obtained coat was dried, it was rolled using a roll-press machine so that an electrode density (a density of a positive electrode active material-including layer 62) would be 3.0 g/cm³. Finally, the portion 63 where the slurry was not applied was punched to form a narrow portion 63 to be the positive electrode lead shown in FIG. 1. Thus, multiple positive electrodes 6 were manufactured.

[Manufacture of Negative Electrode 7]

As the negative electrode active material, a lithium titanate $Li_4Ti_5O_{12}$ was used. The active material, graphite, and polyvinylidene fluoride were mixed in a ratio of 100:9:4. Subsequently, the mixture was kneaded using N-methyl-2-pyrrolidone as a solvent, to obtain a mixture. Subsequently, the mixture was stirred to manufacture a negative electrode slurry. The obtained negative electrode slurry was applied onto an aluminum foil as a negative electrode current collector 71 having a thickness of 20 μm using a coating apparatus, such that an applied amount per unit area would be 50 g/m². At that time, a portion was left on the aluminum foil 71, where the slurry was not applied. After the obtained coat was dried, it was rolled using a roll press machine, so that an electrode density (a density of a negative electrode active material-including layer 72) would be 2.4 g/cm$^3$. The portion where the slurry was not applied was punched, in the same manner as for the positive electrode 6, to form a narrow portion, to be the negative electrode lead, similar to the positive electrode lead of the positive electrode 6 shown in FIG. 1. Thus, multiple negative electrodes 7 were manufactured.

[Manufacture of Electrode Group 2]

A belt-shaped microporous film separator 8 having a thickness of 30 μm was prepared. The separator 8 was folded in zigzag, and the positive electrode 6, the negative electrode 7, and the separator 8 were stacked as explained above with reference to FIG. 3. At that time, the multiple positive electrode leads 63 and the multiple negative electrode leads were set so that they extend out from the stack in opposite directions to each other. Finally, a winding tape, which is not shown, was used to tape the obtained stack together to thereby obtain an electrode group 2.

[Connection of Positive Electrode Tab 4 and Negative Electrode Tab 5 to Electrode Group 2]

A positive electrode tab 4 and a negative electrode tab 5 were manufactured using aluminum. Subsequently, the positive electrode leads 63 of the multiple positive electrodes 6 were collected into one and connected to the positive electrode tab 4. Similarly, the negative electrode leads 73 of the multiple negative electrodes 7 were collected into one and connected to the negative electrode tab 5. As such, the positive electrode tab 4 and the negative electrode tab 5 were set so that they extend out from the electrode group 2 in opposite directions to each other, so that collection of power from the positive electrode 6 and the negative electrode 7 can be performed easily.

[Manufacture of Container 3]

For the container 3, an aluminum-including laminate film was used. First, an aluminum-including laminate film 3 was molded into a shape capable of housing the electrode group 2 described above. The electrode group 2 was housed in the thus molded aluminum-including laminate film 3 as explained above with reference to FIGS. 2 and 3. At that time, as shown in FIG. 3, the positive electrode tab 4 was held by the resin film 32 at the periphery 3b of the container 3. Similarly, the negative electrode tab 5 was held by the resin film 32 at the periphery 3c of the container 3, although not shown in FIG. 3. Insulating films 9 were disposed between the positive electrode tab 4 and the resin film 32, and between the negative electrode tab 5 and the resin film 32.

Subsequently, the resin films 32 facing each other were fixed by thermal fusion at the peripheries 3a, 3b, and 3c, while a portion was left unsealed. At the same time, at the periphery 3b, the resin film 32 and the insulating film 9 facing the resin film 32 were fixed by the thermal fusion, and the positive electrode tab 4 and the insulating film 9 facing the positive electrode tab 4 were fixed by the thermal fusion. Similarly, at the periphery 3c, the resin film 32 and the insulating film 9 facing the resin film 32 were fixed by the thermal fusion, and the negative electrode tab 5 and the insulating film 9 facing the negative electrode tab 5 were fixed by the thermal fusion. Thus, a cell before an injection of nonaqueous electrolyte was manufactured.

[Injection of Nonaqueous Electrolyte]

For the nonaqueous electrolyte, a mixture of ethylene carbonate and dimethyl carbonate in a ratio of 1:1 was used as the nonaqueous solvent, and 2 mol/l of lithium hexafluorophosphate was used as the electrolyte. The nonaqueous electrolyte was injected into the above described cell. The nonaqueous electrolyte was injected through the unsealed portion of the periphery of the container 3 which was not thermally fused.

[Manufacture of Nonaqueous Electrolyte Battery 1]

Finally, the unsealed portion of the periphery of the container 3 which was not thermally fused was thermally fused to manufacture a nonaqueous electrolyte battery 1.

[Evaluation]

The charge and discharge cycle characteristic, the energy density property, the output characteristic, and the particle size distribution of the positive electrode active material-including layer 62 of the thus manufactured nonaqueous electrolyte battery 1 of Example 1 were measured by the following procedures.

(Charge and Discharge Cycle Characteristic)

The nonaqueous electrolyte battery 1 of Example 1 was repeatedly subjected to a charge and discharge cycle 1000 times under a 60° C. environment. The charge was performed until the voltage of the nonaqueous electrolyte battery 1 reached 2.7 V. The discharge was performed until the voltage of the nonaqueous electrolyte battery 1 reached 2.0 V.

At that time, the charge and the discharge were performed at a current value of 5 C. A capacity at the first cycle (the first charge and discharge) and a capacity at the 1000th cycle were measured.

A value obtained by dividing the capacity obtained at the 1000th cycle by the capacity at the first cycle was defined as a capacity retention rate after 1000 cycles.

The nonaqueous electrolyte battery 1 of Example 1 had a capacity retention rate after 1000 cycles of 92%.

(Output Characteristic and Energy Density)

The nonaqueous electrolyte battery 1 of Example 1 having a voltage of 2.70 V was discharged at a rate of 3.0 C until the voltage reached 2.40 V. A time taken for discharge was measured as an output time (second). The output time is an indicator of the output characteristics, and the longer the output time, the more excellent the output characteristics. An energy (Wh) was obtained by integrating the multiplication product between the capacity discharged by the discharge and the voltage, and the resulting energy was divided by a volume of a cell unit to calculate an energy density per cell of the same volume (Wh/cell).

The nonaqueous electrolyte battery 1 of Example 1 had an output time of 81 seconds, and an energy density of 1.22 Wh/cell.

(Measurement of Particle Size Distribution of Positive Electrode Active Material-Including Layer 62)

As for the nonaqueous electrolyte battery 1 of Example 1, a particle size distribution of the positive electrode active material-including layer 62 was measured using a laser diffraction scattering particle diameter and particle size distribution measuring apparatus, according to the method explained above.

Figure 5:
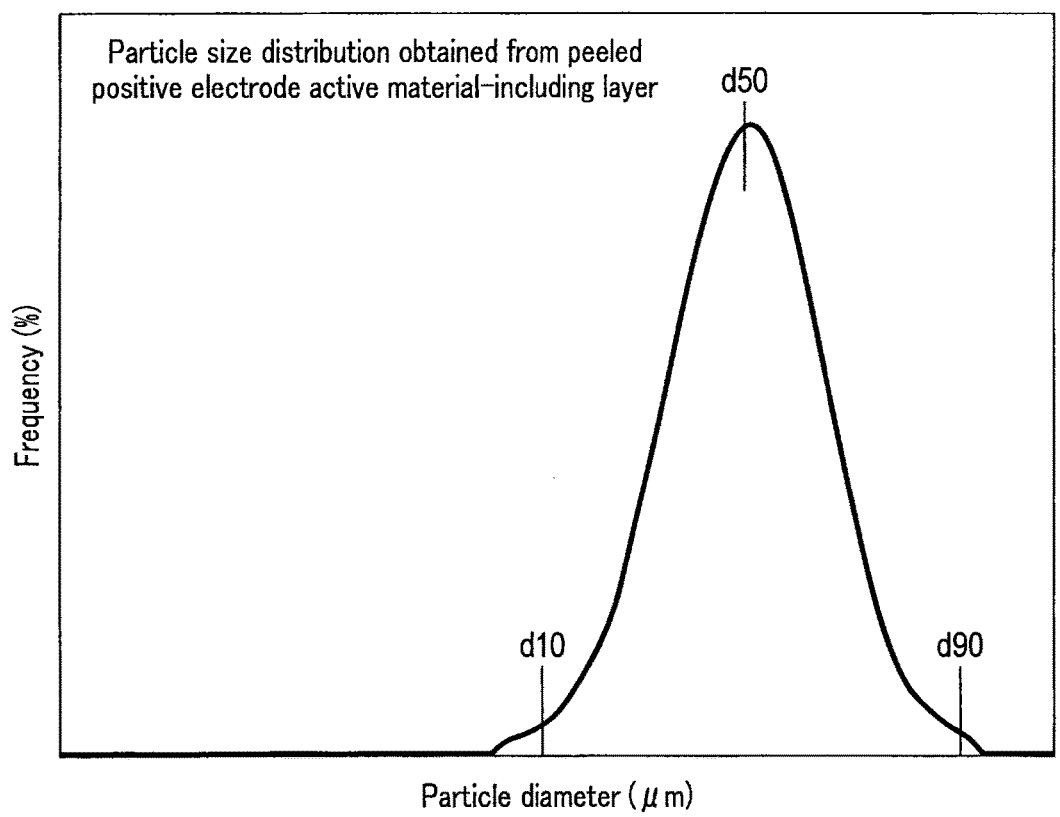
FIG. 5 shows a particle size distribution of a positive electrode active material-including layer in a positive electrode manufactured in Example 1.

A particle size distribution of the positive electrode active material-including layer 62 included in the nonaqueous electrolyte battery 1 of Example 1 is shown in FIG. 5. In the particle size distribution of the positive electrode active material-including layer 62 in the nonaqueous electrolyte battery 1 of Example 1, the average particle diameter $d_{50}$ was 4.9 μm, the particle diameter $d_{10}$ was 2.7 μm, and the particle diameter $d_{90}$ was 8.6 μm. The value of X, represented by $X=(d_{50}-d_{10})/d_{50}$, was 0.45, and the value of Y, represented by $Y=(d_{90}-d_{50})/d_{90}$, was 0.43.

(Measurement of Pore Size Distribution of Positive Electrode Active Material-Including Layer 62)

As for the nonaqueous electrolyte battery 1 of Example 1, a pore size distribution of the positive electrode active material-including layer 62 was measured using a pore distribution measuring apparatus, according to the method explained above. In the pore size distribution of the positive electrode active material-including layer 62 in the nonaqueous electrolyte battery 1 of Example 1, the median diameter $D_m$, was 0.36 µm, and the mode diameter $D_{mo}$ was 0.36 µm.

Example 2

In Example 2, a nonaqueous electrolyte battery 1 of Example 2 was manufactured in the same manner as in Example 1 except that an Al-substituted lithium-manganese oxide $LiMn_{1.5}Al_{0.5}O_4$ having an average particle diameter of 5.4 µm was used as the positive electrode active material. In a particle size distribution of the positive electrode active material used in Example 2 in a solitary state before mixing, the particle diameters $d_{10}$, $d_{50}$, and $d_{90}$ were, respectively, 4.3 µm, 5.4 µm, and 7.5 µm.

[Evaluation]

The nonaqueous electrolyte battery 1 of Example 2 was evaluated in the same manner as in Example 1.

As a result, the nonaqueous electrolyte battery 1 of Example 2 had a capacity retention rate after 1000 cycles of 95%. In addition, the nonaqueous electrolyte battery 1 of Example 2 had an output time of 98 seconds, and an energy density of 1.25 Wh/cell.

In a particle size distribution of the positive electrode active material-including layer 62 in the nonaqueous electrolyte battery 1 of Example 2, the average particle diameter $d_{50}$ was 4.8 µm, the particle diameter $d_{10}$ was 2.6 µm, and the particle diameter $d_{90}$ was 8.5 µm. The value of X, represented by $X=(d_{50}-d_{10})/d_{50}$, was 0.46, and the value of Y, represented by $Y=(d_{90}-d_{50})/d_{90}$, was 0.44.

Example 3

In Example 3, a nonaqueous electrolyte battery 1 of Example 3 was manufactured in the same manner as in Example 1 except that an Al-substituted lithium-manganese oxide $LiMn_{1.7}Al_{0.3}O_4$ having an average particle diameter of 5.4 µm was used as the positive electrode active material, and the active material, acetylene black, graphite, and polyvinylidene fluoride were mixed in a weight ratio of 100:7:0:2. In a particle size distribution of the positive electrode active material used in Example 3 in a solitary state before mixing, the particle diameters $d_{10}$, $d_{50}$, and $d_{90}$ were, respectively, 4.2 µm, 5.4 µm, and 7.7 µm.

[Evaluation]

The nonaqueous electrolyte battery 1 of Example 3 was evaluated in the same manner as in Example 1.

As a result, the nonaqueous electrolyte battery 1 of Example 3 had a capacity retention rate after 1000 cycles of 94%. In addition, the nonaqueous electrolyte battery 1 of Example 3 had an output time of 124 seconds, and an energy density of 1.40 Wh/cell.

In a particle size distribution of the positive electrode active material-including layer 62 in the nonaqueous electrolyte battery 1 of Example 3, the average particle diameter $d_{50}$ was 3.7 µm, the particle diameter $d_{10}$ was 2.0 µm, and the particle diameter $d_{90}$ was 6.4 µm. The value of X, represented by $X=(d_{50}-d_{10})/d_{50}$, was 0.46, and the value of Y, represented by $Y=(d_{90}-d_{50})/d_{90}$, was 0.42.

Example 4

In Example 4, a nonaqueous electrolyte battery 1 of Example 4 was manufactured in the same manner as in Example 1 except that an Mg-substituted lithium-manganese oxide $LiMn_{1.7}Mg_{0.3}O_4$ having an average particle diameter of 5.4 µm was used as the positive electrode active material. In a particle size distribution of the positive electrode active material used in Example 4 in a solitary state before mixing, the particle diameters $d_{10}$, $d_{50}$, and $d_{90}$ were, respectively, 4.3 µm, 5.4 µm, and 7.8 µm.

[Evaluation]

The nonaqueous electrolyte battery 1 of Example 4 was evaluated in the same manner as in Example 1.

As a result, the nonaqueous electrolyte battery 1 of Example 4 had a capacity retention rate after 1000 cycles of 88%. In addition, the nonaqueous electrolyte battery 1 of Example 4 had an output time of 57 seconds, and an energy density of 1.09 Wh/cell.

In a particle size distribution of the positive electrode active material-including layer 62 in the nonaqueous electrolyte battery 1 of Example 4, the average particle diameter $d_{50}$ was 4.8 µm, the particle diameter $d_{10}$ was 2.5 µm, and the particle diameter $d_{90}$ was 8.4 µm. The value of X, represented by $X=(d_{50}-d_{10})/d_{50}$, was 0.48, and the value of Y, represented by $Y=(d_{90}-d_{50})/d_{90}$, was 0.43.

Example 5

In Example 5, a nonaqueous electrolyte battery 1 of Example 5 was manufactured in the same manner as in Example 1 except that an Fe-substituted lithium-manganese oxide $LiMn_{1.7}Fe_{0.3}O_4$ having an average particle diameter of 5.4 µm was used as the positive electrode active material. In a particle size distribution of the positive electrode active material used in Example 5 in a solitary state before mixing, the particle diameters $d_{10}$, $d_{50}$, and $d_{90}$ were, respectively, 4.1 µm, 5.4 µm, and 7.6 µm.

[Evaluation]

The nonaqueous electrolyte battery 1 of Example 5 was evaluated in the same manner as in Example 1.

As a result, the nonaqueous electrolyte battery 1 of Example 5 had a capacity retention rate after 1000 cycles of 85%. In addition, the nonaqueous electrolyte battery 1 of Example 5 had an output time of 59 seconds, and an energy density of 1.12 Wh/cell.

In a particle size distribution of the positive electrode active material-including layer 62 in the nonaqueous electrolyte battery 1 of Example 5, the average particle diameter $d_{50}$ was 4.8 µm, the particle diameter $d_{10}$ was 2.6 µm, and the particle diameter $d_{90}$ was 8.6 µm. The value of X, represented by $X=(d_{50}-d_{10}))/d_{50}$, was 0.46, and the value of Y, represented by $Y=(d_{90}-d_{50})/d_{90}$, was 0.44.

Example 6

In Example 6, a nonaqueous electrolyte battery 1 of Example 6 was manufactured in the same manner as in Example 1 except that a Co-substituted lithium-manganese oxide $LiMn_{1.7}Co_{0.3}O_4$ having an average particle diameter of 5.4 µm was used as the positive electrode active material. In a particle size distribution of the positive electrode active material used in Example 6 in a solitary state before mixing, the particle diameters $d_{10}$, $d_{50}$, and $d_{90}$ were, respectively, 4.3 µm, 5.4 µm, and 7.6 µm.

[Evaluation]

The nonaqueous electrolyte battery 1 of Example 6 was evaluated in the same manner as in Example 1.

As a result, the nonaqueous electrolyte battery 1 of Example 6 had a capacity retention rate after 1000 cycles of 89%. In addition, the nonaqueous electrolyte battery 1 of Example 6 had an output time of 62 seconds, and an energy density of 1.19 Wh/cell.

In a particle size distribution of the positive electrode active material-including layer 62 in the nonaqueous electrolyte battery 1 of Example 6, the average particle diameter $d_{50}$ was 4.9 μm, the particle diameter $d_{10}$ was 2.5 μm, and the particle diameter $d_{90}$ was 8.6 μm. The value of X, represented by $X=(d_{50}-d_{10})/d_{50}$, was 0.49, and the value of Y, represented by $Y=(d_{90}-d_{50})/d_{90}$, was 0.43.

Example 7

In Example 7, a nonaqueous electrolyte battery 1 of Example 7 was manufactured in the same manner as in Example 1 except that an Al and Mg-substituted lithium-manganese oxide $LiMn_{1.7}Al_{0.2}Mg_{0.1}O_4$ having an average particle diameter of 5.5 μm was used as the positive electrode active material. In a particle size distribution of the positive electrode active material used in Example 7 in a solitary state before mixing, the particle diameters $d_{10}$, $d_{50}$, and $d_{90}$ were, respectively, 4.1 μm, 5.5 μm, and 7.7 μm.

[Evaluation]

The nonaqueous electrolyte battery 1 of Example 7 was evaluated in the same manner as in Example 1.

As a result, the nonaqueous electrolyte battery 1 of Example 7 had a capacity retention rate after 1000 cycles of 91%. In addition, the nonaqueous electrolyte battery 1 of Example 7 had an output time of 70 seconds, and an energy density of 1.15 Wh/cell.

In a particle size distribution of the positive electrode active material-including layer 62 in the nonaqueous electrolyte battery 1 of Example 7, the average particle diameter $d_{50}$ was 4.8 μm, the particle diameter $d_{10}$ was 2.7 μm, and the particle diameter $d_{90}$ was 8.7 μm. The value of X, represented by $X=(d_{50}-d_{10})/d_{50}$, was 0.44, and the value of Y, represented by $Y=(d_{90}-d_{50})/d_{90}$, was 0.45.

Example 8

In Example 8, a nonaqueous electrolyte battery 1 of Example 8 was manufactured in the same manner as in Example 1 except that an Al-substituted lithium-manganese oxide $LiMn_{1.7}Al_{0.3}O_4$ was pulverized in a mortar to adjust the average particle diameter of the active material to 2.8 μm. In a particle size distribution of the positive electrode active material used in Example 8 in a solitary state before mixing, the particle diameters $d_{10}$, $d_{50}$, and $d_{90}$ were, respectively, 1.7 μm, 2.8 μm, and 5.8 μm.

[Evaluation]

The nonaqueous electrolyte battery 1 of Example 8 was evaluated the same manner as in Example 1.

As a result, the nonaqueous electrolyte battery 1 of Example 8 had a capacity retention rate after 1000 cycles of 89%. In addition, the nonaqueous electrolyte battery 1 of Example 8 had an output time of 183 seconds, and an energy density of 1.68 inch/cell.

In a particle size distribution of the positive electrode active material-including layer 62 in the nonaqueous electrolyte battery 1 of Example 8, the average particle diameter $d_{50}$ was 2.3 μm, the particle diameter $d_{10}$ was 0.5 μm, and the particle diameter $d_{90}$ was 5.1 μm. The value of X, represented by $X=(d_{50}-d_{10})/d_{50}$, was 0.78, and the value of Y, represented by $Y=(d_{90}-d_{50})/d_{90}$, was 0.55.

For the nonaqueous electrolyte battery 1 of Example 8, a pore size distribution of the positive electrode active material-including layer 62 was measured using a pore distribution measuring apparatus, according to the method explained above. In the pore size distribution of the positive electrode active material-including layer 62 in the nonaqueous electrolyte battery 1 of Example 8, the median diameter $D_{me}$ was 0.27 μm, and the mode diameter $D_{mo}$ was 0.19 μm.

Comparative Example 1

In Comparative Example 1, a nonaqueous electrolyte battery of Comparative Example 1 was manufactured in the same manner as in Example 1 except that an Al-substituted lithium-manganese oxide $LiMn_{1.8}Al_{0.2}O_4$ having an average particle diameter of 5.4 μm was used as the positive electrode active material. In a particle size distribution of the positive electrode active material used in Comparative Example 1 in a solitary state before mixing, the particle sizes $d_{10}$, $d_{50}$, and $d_{90}$ were, respectively, 4.3 μm, 5.4 μm, and 7.7 μm.

[Evaluation]

The nonaqueous electrolyte battery of Comparative Example 1 was evaluated in the same manner as in Example 1.

As a result, the nonaqueous electrolyte battery of Comparative Example 1 had a capacity retention rate after 1000 cycles of 85%. In addition, the nonaqueous electrolyte battery of Comparative Example 1 had an output time of 36 seconds, and an energy density of 1.12 Wh/cell.

In a particle size distribution of the positive electrode active material-including layer in the nonaqueous electrolyte battery of Comparative Example 1, the average particle diameter $d_{50}$ was 4.9 μm, the particle diameter $d_{10}$ was 2.8 μm, and the particle diameter $d_{90}$ was 8.5 μm. The value of X, represented by $X=(d_{50}-d_{10})/d_{50}$, was 0.43, and the value of Y, represented by $Y=(d_{90}-d_{50})/d_{90}$, was 0.42.

Comparative Example 2

In Comparative Example 2, a nonaqueous electrolyte battery of Comparative Example 2 was manufactured in the same manner as in Example 1 except that an Al and Mg-substituted lithium-manganese oxide $LiMn_{1.8}Al_{0.1}Mg_{0.1}O_4$ having an average particle diameter of 5.4 μm was used as the positive electrode active material. In a particle diameter distribution of the positive electrode active material used in Comparative Example 2 in a solitary state before mixing, the particle diameters $d_{10}$, $d_{50}$, and $d_{90}$ were, respectively, 4.1 μm, 5.4 μm, and 7.6 μm.

[Evaluation]

The nonaqueous electrolyte battery of Comparative Example 2 was evaluated in the same manner as in Example 1.

As a result, the nonaqueous electrolyte battery of Comparative Example 2 had a capacity retention rate after 1000 cycles of 78%. In addition, the nonaqueous electrolyte battery of Comparative Example 2 had an output time of 31 seconds, and an energy density of 1.05 Wh/cell.

In a particle size distribution of the positive electrode active material-including layer in the nonaqueous electrolyte battery of Comparative Example 2, the average particle diameter $d_{50}$ was 4.9 μm, the particle diameter $d_{10}$ was 2.7 μm, and the particle diameter $d_{90}$ was 8.6 μm. The value of X, represented by $X=(d_{50}-d_{10})/d_{50}$, was 0.45, and the value of Y, represented by $Y=(d_{90}-d_{50})/d_{90}$, was 0.43.

Comparative Example 3

In Comparative Example 3, a nonaqueous electrolyte battery of Comparative Example 3 was manufactured in the same manner as in Example 1 except that an Al and Mg-substituted lithium-manganese oxide $LiMn_{1.2}Al_{0.8}O_4$ having an average particle diameter of 5.4 μm was used as the positive electrode active material. In a particle size distribution of the positive electrode active material used in Comparative Example 3 in a solitary state before mixing, the particle diameters $d_{10}$, $d_{50}$, and $d_{90}$ were, respectively, 4.0 μm, 5.4 μm, and 7.6 μm.

[Evaluation]

The nonaqueous electrolyte battery of Comparative Example 3 was evaluated in the same manner as in Example 1.

As a result, the nonaqueous electrolyte battery of Comparative Example 3 had a capacity retention rate after 1000 cycles of 93%. In addition, the nonaqueous electrolyte battery of Comparative Example 3 had an output time of 112 seconds, and an energy density of 0.98 Wh/cell.

In a particle size distribution of the positive electrode active material-including layer in the nonaqueous electrolyte battery of Comparative Example 3, the average particle diameter $d_{50}$ was 4.9 μm, the particle diameter $d_{10}$ was 2.7 μm, and the particle diameter $d_{90}$ was 8.5 μm. The value of X, represented by $X=(d_{50}-d_{10})/d_{50}$, was 0.45, and the value of Y, represented by $Y=(d_{90}-d_{50})/d_{90}$, was 0.42.

Comparative Example 4

In Comparative Example 4, a nonaqueous electrolyte battery of Comparative Example 4 was manufactured in the same manner as in Example 1 except that an Al and Mg-substituted lithium-manganese oxide $LiMn_{1.7}Al_{0.3}O_4$ having an average particle diameter of 10.5 μm was used as the positive electrode active material. In a particle size distribution of the positive electrode active material used in Comparative Example 4 in a solitary state before mixing, the particle diameters $d_{10}$, $d_{50}$, and $d_{90}$ were, respectively, 7.8 μm, 10.5 μm, and 33.2 μm.

[Evaluation]

The nonaqueous electrolyte battery of Comparative Example 4 was evaluated in the same manner as in Example 1.

As a result, the nonaqueous electrolyte battery of Comparative Example 4 had a capacity retention rate after 1000 cycles of 93%. In addition, the nonaqueous electrolyte battery of Comparative Example 4 had an output time of 28 seconds, and an energy density of 1.01 Wh/cell.

In a particle size distribution of the positive electrode active material-including layer in the nonaqueous electrolyte battery of Comparative Example 4, the average particle diameter $d_{50}$ was 9.2 μm, the particle diameter $d_{10}$ was 3.1 μm, and the particle diameter $d_{90}$ was 25.4 μm. X, represented by $X=(d_{50}-d_{10})/d_{50}$, was 0.66, and Y, represented by $Y=(d_{90}-d_{50})/d_{90}$, was 0.64.

Comparative Example 5

In Comparative Example 5, a nonaqueous electrolyte battery of Comparative Example 5 was manufactured in the same manner as in Example 1 except that an Al-substituted lithium-manganese oxide $LiMn_{1.7}Al_{0.3}O_4$ was pulverized in a mortar to adjust the average particle diameter of the active material to 2.3 μm. In a particle size distribution of the positive electrode active material used in Comparative Example 5 in a solitary state before mixing, the particle diameters $d_{10}$, $d_{50}$, and $d_{90}$ were, respectively, 0.8 μm, 2.3 μm, and 5.0 μm.

[Evaluation]

The nonaqueous electrolyte battery of Comparative Example 5 was evaluated in the same manner as in Example 1.

As a result, the nonaqueous electrolyte battery of Comparative Example 5 had a capacity retention rate after 1000 cycles of 81%. In addition, the nonaqueous electrolyte battery of Comparative Example 5 had an output time of 195 seconds, and an energy density of 1.74 Wh/cell.

In a particle size distribution of the positive electrode active material-including layer in the nonaqueous electrolyte battery of Comparative Example 5, the average particle diameter $d_{50}$ was 1.8 μm, the particle diameter $d_{10}$ was 0.4 μm, and the particle diameter $d_{90}$ was 3.9 μm. The value of X, represented by $X=(d_{50}-d_{10})/d_{50}$, was 0.78, and the value of Y, represented by $Y=(d_{90}-d_{50})/d_{90}$, was 0.54.

For the nonaqueous electrolyte battery of Comparative Example 5, a pore size distribution of the positive electrode active material-including layer was measured using a pore distribution measuring apparatus, according to the method explained above. In the pore size distribution of the positive electrode active material-including layer in the nonaqueous electrolyte battery of Comparative Example 5, the median diameter $D_{me}$ was 0.13 μm, and the mode diameter $D_{mo}$ was 0.14 μm.

Comparative Example 6

In Comparative Example 6, a nonaqueous electrolyte battery of Comparative Example 6 was manufactured in the same manner as in Example 1 except that the positive electrode active material, the acetylene black, the graphite, and the polyvinylidene fluoride were mixed in a weight ratio of 100:1:6:2. In a particle size distribution of the positive electrode active material used in Comparative Example 6 in a solitary state before mixing, the particle diameters $d_{10}$, $d_{50}$, and $d_{90}$ were, respectively, 4.4 μm, 5.6 μm, and 7.6 μm.

[Evaluation]

The nonaqueous electrolyte battery of Comparative Example 6 was evaluated in the same manner as in Example 1.

As a result, the nonaqueous electrolyte battery of Comparative Example 6 had a capacity retention rate after 1000 cycles of 85%. In addition, the nonaqueous electrolyte battery of Comparative Example 6 had an output time of 45 seconds, and an energy density of 1.04 Wh/cell.

In a particle size distribution of the positive electrode active material-including layer in the nonaqueous electrolyte battery of Comparative Example 6, the average particle diameter $d_{50}$ was 4.7 μm, the particle diameter $d_{10}$ was 3.0 μm, and the particle diameter $d_{90}$ was 8.6 μm. The value of X, represented by $X=(d_{50}-d_{10})/d_{50}$, was 0.36, and the value of Y, represented by $Y=(d_{90}-d_{50})/d_{90}$, was 0.45.

The results of Examples 1 to 8 and Comparative Examples 1 to 6 are summarized in Tables 1 and 2 below.

TABLE 1

|  | Element M | x | $d_{10}$ (μm) | $d_{50}$ (μm) | $d_{90}$ (μm) | X | Y | Amount of Active Material Included (%) |
|---|---|---|---|---|---|---|---|---|
| Example 1 | Al | 0.3 | 2.7 | 4.9 | 8.6 | 0.45 | 0.43 | 92 |
| Example 2 | Al | 0.5 | 2.6 | 4.8 | 8.5 | 0.46 | 0.44 | 92 |
| Example 3 | Al | 0.3 | 2.0 | 3.7 | 6.4 | 0.46 | 0.42 | 92 |
| Example 4 | Mg | 0.3 | 2.5 | 4.8 | 8.4 | 0.48 | 0.43 | 92 |
| Example 5 | Fe | 0.3 | 2.6 | 4.8 | 8.6 | 0.46 | 0.44 | 92 |
| Example 6 | Co | 0.3 | 2.5 | 4.9 | 8.6 | 0.49 | 0.43 | 92 |
| Example 7 | Al, Mg | 0.3 | 2.7 | 4.8 | 8.7 | 0.44 | 0.45 | 92 |
| Example 8 | Al | 0.3 | 0.5 | 2.3 | 5.1 | 0.78 | 0.55 | 92 |
| Comparative Example 1 | Al | 0.2 | 2.8 | 4.9 | 8.5 | 0.43 | 0.42 | 92 |
| Comparative Example 2 | Al, Mg | 0.2 | 2.7 | 4.9 | 8.6 | 0.45 | 0.43 | 92 |
| Comparative Example 3 | Al | 0.8 | 2.7 | 4.9 | 8.5 | 0.45 | 0.42 | 92 |
| Comparative Example 4 | Al | 0.3 | 3.1 | 9.2 | 25.4 | 0.66 | 0.64 | 92 |
| Comparative Example 5 | Al | 0.3 | 0.3 | 1.8 | 3.9 | 0.83 | 0.54 | 92 |
| Comparative Example 6 | Al | 0.3 | 3.0 | 4.7 | 8.6 | 0.36 | 0.45 | 92 |

TABLE 2

|  | Energy Density (Wh/cell) | Output Time (seconds) | Capacity Retention Rate after 1000 Cycles (%) |
|---|---|---|---|
| Example 1 | 1.22 | 81 | 92 |
| Example 2 | 1.25 | 98 | 95 |
| Example 3 | 1.40 | 124 | 94 |
| Example 4 | 1.09 | 57 | 88 |
| Example 5 | 1.12 | 59 | 85 |
| Example 6 | 1.19 | 62 | 89 |
| Example 7 | 1.15 | 70 | 91 |
| Example 8 | 1.68 | 183 | 89 |
| Comparative Example 1 | 1.12 | 36 | 85 |
| Comparative Example 2 | 1.05 | 31 | 78 |
| Comparative Example 3 | 0.98 | 112 | 93 |
| Comparative Example 4 | 1.01 | 28 | 93 |
| Comparative Example 5 | 1.74 | 195 | 81 |
| Comparative Example 6 | 1.04 | 45 | 85 |

The particle size distributions of the positive electrode active materials in a solitary state before mixing, of Examples 1 to 8 and Comparative Examples 1 to 6 are summarized in Table 3 below. In addition, the particle size distributions of the conductive agents acetylene black and graphite, respectively in a solitary state before mixing, are summarized in table 4 below.

TABLE 3

| Positive Electrode Active Material in a Solitary State | $D_{10}$ (μm) | $D_{50}$ (μm) | $D_{90}$ (μm) |
|---|---|---|---|
| Example 1 | $LiMn_{1.7}Al_{0.3}O_4$ | 4.4 | 5.6 | 7.6 |
| Example 2 | $LiMn_{1.5}Al_{0.5}O_4$ | 4.3 | 5.4 | 7.5 |
| Example 3 | $LiMn_{1.7}Al_{0.3}O_4$ | 4.2 | 5.4 | 7.7 |
| Example 4 | $LiMn_{1.7}Mg_{0.3}O_4$ | 4.3 | 5.4 | 7.8 |
| Example 5 | $LiMn_{1.7}Fe_{0.3}O_4$ | 4.1 | 5.4 | 7.6 |
| Example 6 | $LiMn_{1.7}Co_{0.3}O_4$ | 4.3 | 5.4 | 7.6 |
| Example 7 | $LiMn_{1.7}Al_{0.2}Mg_{0.1}O_4$ | 4.1 | 5.5 | 7.7 |
| Example 8 | $LiMn_{1.7}Al_{0.3}O_4$ | 1.7 | 2.8 | 5.8 |
| Comparative Example 1 | $LiMn_{1.8}Al_{0.2}O_4$ | 4.3 | 5.4 | 7.7 |
| Comparative Example 2 | $LiMn_{1.8}Al_{0.1}Mg_{0.1}O_4$ | 4.1 | 5.4 | 7.6 |
| Comparative Example 3 | $LiMn_{1.2}Al_{0.8}O_4$ | 4.0 | 5.4 | 7.6 |
| Comparative Example 4 | $LiMn_{1.7}Al_{0.3}O_4$ | 7.8 | 10.5 | 33.2 |
| Comparative Example 5 | $LiMn_{1.7}Al_{0.3}O_4$ | 0.8 | 2.3 | 5.0 |
| Comparative Example 6 | $LiMn_{1.7}Al_{0.3}O_4$ | 4.4 | 5.6 | 7.6 |

TABLE 4

| Conductive Agent in a Solitary State | $D_{10}$ (μm) | $D_{50}$ (μm) | $D_{90}$ (μm) |
|---|---|---|---|
| Acetylene Black | 0.2 | 0.7 | 3.3 |
| Graphite | 2.5 | 3.9 | 6.1 |

[Results]

As shown in Table 1 and Table 2, the nonaqueous electrolyte batteries 1 of Examples 1 to 8 exhibited high energy density, long output time, and high capacity retention. On the other hand, the nonaqueous electrolyte batteries of Comparative Examples 1 to 6 are inferior to the nonaqueous electrolyte batteries 1 of Examples 1 to 8, in at least one of the energy density, the output time, and the capacity retention rate. That is, it was found that the nonaqueous electrolyte batteries of Examples 1 to 8 was able exhibit high output while good charge and discharge cycle characteristics and good energy density were secured.

This is considered to be due to the following reasons.

First, the nonaqueous electrolyte batteries 1 of Examples 1 to 8 included at least one lithium-manganese oxide represented by $LiMn_{2-x}M_xO_4$ as the positive electrode active material, and the lithium manganese cobalt oxide included at least one metal element M selected from the group consisting of Mg, Ti, Cr, Fe, Co, Zn, Al, and Ga as the substituting element so that subscript x is within a range of 0.22 to 0.7. When the substituting element M exists in the crystal structure of the lithium-manganese oxide, as such, the crystal structure is stabilized. It can be considered that, as a result, the change in the crystal structure of the positive electrode active material, caused by the insertion and release of lithium ions accompanying charge and discharge of the nonaqueous electrolyte battery, had been small, and thus good charge and discharge cycle characteristics were exhibited. It can also be considered that the reason that the nonaqueous electrolyte batteries 1 of Examples 1 to 8 was able to exhibit excellent charge and discharge cycle characteristics is that the elution of Mn from the lithium-manganese oxide can be suppressed during the charge and discharge cycle test at 60° C. It can further be considered that in the nonaqueous electrolyte batteries 1 of Examples 1 to 8, the lattice constant of the crystal structure of the positive electrode active material decreased, and thus the acceptance property of the lithium ions at large current discharge was improved, and as a result, high output characteristic could be exhibited.

As for the nonaqueous electrolyte batteries 1 of Examples 1 to 8, in the particle size distribution of the positive electrode active material-including layer 62 obtained by the laser diffraction scattering method, the average particle diameter $d_{50}$ was within a range of 2 μm to 5 μm, the particle diameter $d_{10}$ was within a range of 5 μm to 3 μm, and the particle diameter $d_{90}$ was within a range of 4 μm to 10 μm. In addition, X, represented by $X=(d_{50}-d_{10})/d_{50}$, was within a range of 0.4 to 0.8, and Y, represented by $Y=(d_{90}-d_{50})/d_{90}$, was within a range of 0.2 to 0.6. It can be considered that in such a positive electrode active material-including layer 62, the positive electrode active material particles was able have small particle diameters and large surface areas. It can be considered that the positive electrode active material-including layer 62 was able to have high density. It can be presumed that, owing to the above, the nonaqueous electrolyte batteries 1 of Examples 1 to 8 could suppress electrical resistance during the high rate discharge, and thus the long discharge time and the high energy density was able to be secured.

In particular, the nonaqueous electrolyte battery 1 of Example 2 showed charge and discharge cycle characteristics more excellent than those of the nonaqueous electrolyte batteries 1 of Examples 1, and 3 to 8. It can be considered that because in Example 2, subscript x was 0.5, which was the highest value of those in Examples 1 to 8, and still within a range of 0.22 to 0.7. The crystal structure of the positive electrode active material of Example 2 is stabilized because a large number of Al atoms are substituted into the crystal structure. Therefore, the change in crystal structure of the positive electrode active material, caused by insertion and release of lithium ions accompanying charge and discharge of the nonaqueous electrolyte battery, was small. It can be presumed that, as a result, the nonaqueous electrolyte battery 1 of Example 2 exhibited the particularly good charge and discharge cycle characteristics.

The nonaqueous electrolyte batteries 1 of Examples 3 and 8 exhibited energy density and output time more excellent than those of the nonaqueous electrolyte batteries 1 of Examples 1, 2, and 4 to 7. It can be considered that an effect of increasing the surface area of the particle by decreasing the average particle diameter $d_{50}$ in the particle size distribution of the positive electrode active material-including layer 62 had been obtained significantly, which contributed to the increase of output and the increase of energy density.

The nonaqueous electrolyte battery 1 of Example 1, wherein the element for substitution was Al, exhibited the energy density that was even higher, the output time that was even longer, and the capacity retention that was even higher than those of the nonaqueous electrolyte batteries 1 of Examples 4 to 6, in which the substituting elements were, respectively, Mg, Fe, and Co.

On the other hand, the nonaqueous electrolyte batteries of Comparative Examples 1 and 2 were inferior in regard of the output time compared to the nonaqueous electrolyte batteries 1 of Examples 1 to 8. It can be considered that this was caused because the element substitution amount x was 0.2, in the lithium-manganese oxide $LiMn_{2-x}(M_xO_4)$ of the positive electrode active material used in the nonaqueous electrolyte battery of Comparative Example 1. As such, it can be considered that in Comparative Examples 1 and 2, the substitution amount of the metal element M was too small, and as a result, the output characteristic was low and the output time was short.

In particular, it can be considered that, in Comparative Example 2, the effect of stabilizing the crystal structure and the effect of suppressing the change in crystal structure caused by the insertion and release of lithium ions accompanying charge and discharge are low, and thus the charge and discharge cycle characteristics were reduced. It can also be considered that, in Comparative Example 2, it was difficult to obtain the effect of decreasing the lattice constant of the crystal structure, and the acceptance property of lithium ions at large current discharge was deteriorated, and as a result, the output characteristic and the energy density were reduced.

The nonaqueous electrolyte battery of Comparative Example 3 was inferior to the nonaqueous electrolyte batteries 1 of Examples 1 to 8 in regard of the energy density. It can be considered that this was caused because the element substitution amount x was 0.8, in the positive electrode active material used in the nonaqueous electrolyte battery of Comparative Example 3. The substitution amount x of 0.8 means that the amount of Mn atoms in the lithium-manganese oxide that had been substituted was too large. It can be considered that as a consequence, in the nonaqueous electrolyte battery of Comparative Example 3, the amount of Mn participating in charge and discharge was reduced, and as a result, the energy density was reduced.

The nonaqueous electrolyte battery of Comparative Example 4 was inferior to the nonaqueous electrolyte batteries 1 of Examples 1 to 8 in regard of the energy density and the output time. It can be considered that this was caused because the particle diameter $d_{10}$ was larger than 3 μm, the average particle diameter $d_{50}$ was larger than 5 μm, the particle diameter $d_{90}$ was larger than 10 μm, and the value of Y was larger than 0.6, in the particle size distribution of the positive electrode active material-including layer used in the nonaqueous electrolyte battery of Comparative Example 4. It can be presumed that, as a consequence, in the positive electrode of the nonaqueous electrolyte battery of Comparative Example 4, the surface area of the particles was small, and in addition, good conductive paths, obtainable by the conductive agent, which have small particles, could not be achieved.

The nonaqueous electrolyte battery of Comparative Example 5 was inferior to the nonaqueous electrolyte batteries 1 from Examples 1 to 8 in regard of the charge and discharge cycle characteristics. It can be considered that this was caused because the average particle diameter $d_{50}$ was smaller than 2 μm, and the particle diameter $d_{90}$ was smaller than 4 μm, in the particle size distribution of the positive electrode active material-including layer used in the nonaqueous electrolyte battery of Comparative Example 5. It can be presumed that, as a consequence, in the nonaqueous electrolyte battery of Comparative Example 5, the reactivity of side-reactions between the positive electrode and the electrolyte solution increased, and thus the charge and discharge cycle characteristics were reduced.

In addition, it can also be considered that in the nonaqueous electrolyte battery of Comparative Example 5, the median diameter $D_{me}$ and the mode diameter $D_{mo}$ in the pore size distribution of the positive electrode active material-including layer, which were 0.13 μm and 0.14 μm, respectively, contributed to the reduction of charge and discharge cycle characteristics. In the nonaqueous electrolyte battery of Comparative Example 5, the pore size of the positive electrode active material-including layer was too small, and thus the positive electrode active material-including layer could not withstand expansion, stretching, and contracting accompanying charge and discharge cycles. I can be presumed that, the cycle characteristic was reduced as a result.

The nonaqueous electrolyte battery of Comparative Example 6 was inferior to the nonaqueous electrolyte batteries 1 of Examples 1 to 8 in regard of the energy density and the output time. It can be considered that this was caused because the value of X was smaller than 0.4, in the particle size distribution of the positive electrode active material-including layer used in the nonaqueous electrolyte battery of Comparative Example 6. It can be presumed that the value of X of 0.36 means that the particle size of the conductive agent was close to the particle size of the positive electrode active material. It can be considered that this was caused because the proportion of graphite, whose particle size distribution when alone is close to the particle size distribution of the positive electrode active material, was high. It can also be presumed that because the proportion of acetylene black, which has a small particle size when alone, was low, and thereby, in the manufactured positive electrode active material-including layer, the final particle diameter $d_{10}$ had not become small compared to the particle diameter $d_{50}$, thus contributing to the value of X of less than 0.4. It can be considered that, as a consequence, in the nonaqueous electrolyte battery of Comparative Example 6, the density of the positive electrode active material-including layer could not be increased, and as a result, the energy density and the output time were reduced.

In the examples described above, THINKY ARE-250 (Japanese name: Rentaro) was used. However, even if a mixer having the same performances as those of ARE-250 is used instead, positive electrodes having the particle size distribution explained in the first embodiment can be manufactured.

As shown in Table 3 and Table 4, when the particle size distributions of the positive electrode active materials used in Examples 1 to 8 and Comparative Examples 1 to 6 are compared with the particle size distribution of acetylene black, it is apparent that the particle size of acetylene black is remarkably smaller than that of the positive electrode active materials. On the other hand, when the particle size distributions of the positive electrode active materials are compared with the particle size distribution of graphite, it is apparent that graphite has a particle size close to the particle size of the positive electrode active materials.

As described above, the manufacture of the positive electrode includes steps of wet-mixing or stirring of the positive electrode active material and the conductive agent, which are the positive electrode materials, and rolling the slurry including the materials described above, and thus the particle size distribution may vary depending on details of the steps. In the manufactured positive electrode, accordingly, the particle size distribution of the positive electrode active material-including layer may be different from the mere combination of the particle size distributions of the positive electrode active material and the conductive agent. In the examples described above, THINKY ARE-250 (Japanese name: Rentaro) was used for stirring the positive electrode materials. However, even if a mixer having the same performances as those of ARE-250 is used instead, positive electrodes having the particle size distribution explained in the first embodiment can be manufactured.

For the measurement of the particle size distribution of acetylene black, a pre-treatment using ultrasonic wave irradiation is performed, in order to dissociate the aggregates of the acetylene black. The particle size of the acetylene black is too small, however, and therefore the aggregates cannot be completely dissociated by the ultrasonic wave irradiation. For that reason, it can be presumed that the particle size distribution of acetylene black shown in Table 4 was measured in the state where some aggregates had remained. The aggregates of acetylene black are dissociated in a step included in the manufacture of the positive electrode. It can be presumed, accordingly, that in the manufactured positive electrode active material-including layer, the particle size distribution of acetylene black is smaller than the measurement results of the particle size distribution of acetylene black alone.

The positive electrode according to at least one of embodiments and examples explained above includes the lithium-manganese oxide represented by $LiMn_{2-x}M_xO_4$. In the particle size distribution of the positive electrode obtained by the laser diffraction scattering method, the average particle diameter $d_{50}$ is within a range of 2 μm to 5 μm, the particle diameter $d_{10}$ is within a range of 0.5 μm to 3 μm, and the particle diameter $d_{90}$ is within a range of 4 μm to 10 μm. In the positive electrode, furthermore, X, represented by $X=(d_{50}-d_{10})/d_{50}$, is within a range of 0.4 to 0.8, and Y, represented by $Y=(d_{90}-d_{50})/d_{90}$, is within a range of 0.2 to 0.6. Owing to the above, the positive electrode can allow the realization of the nonaqueous electrolyte battery capable of exhibiting high output while good charge and discharge cycle characteristics and good energy density are secured.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A positive electrode comprising:
   a positive electrode current collector; and
   a positive electrode active material-including layer formed on the positive electrode current collector;
   wherein, the positive electrode active material-including layer includes a positive electrode active material and a conductive agent, the positive electrode active material includes a lithium-manganese oxide represented by $LiMn_{2-x}M_xO_4$, in which subscript x is within a range of $0.22 \leq x \leq 0.7$, and M is at least one metal element selected from a group consisting of Mg, Ti, Cr, Fe, Co, Zn, Al, and Ga, and in a particle size distribution of the positive electrode active material-including layer obtained by a laser diffraction scattering method, an average particle diameter $d_{50}$ is within a range of 2 μm to 5 μm, a particle diameter $d_{10}$ at which a cumulative frequency from a small particle diameter side is 10% is within a range of 0.5 μm to 3 μm, and a particle diameter $d_{90}$ at which a cumulative frequency from the small particle diameter side is 90% is within a range of 4 μm to 10 μm, X, represented by $X=(d_{50}-d_{10})/d_{50}$, is within a range of 0.4 to 0.8, and Y, represented by $Y=(d_{90}-d_{50})/d_{90}$, is within a range of 0.2 to 0.6.

2. The positive electrode according to claim 1, wherein the metal element M includes Al.

3. The positive electrode according to claim 2, wherein in a pore size distribution of the positive electrode active material-including layer obtained by a mercury intrusion method, a median diameter $D_{me}$ is within a range of 0.15 μm to less than 0.4 μm, and a mode diameter $D_{mo}$ is within a range of 0.15 μm to less than 0.4 μm.

4. The positive electrode according to claim 2, wherein the positive electrode active material-including layer has a density of 2.8 g/cm² to less than 3.5 g/cm².

5. The positive electrode according to claim 1, wherein an amount of the positive electrode active material included in the positive electrode active material-including layer is 91% to less than 96% relative to a weight of the positive electrode active material-including layer.

6. A nonaqueous electrolyte battery comprising:
the positive electrode according to claim 1;
a negative electrode; and
a nonaqueous electrolyte.

7. The nonaqueous electrolyte battery according to claim 6, wherein
the negative electrode includes an oxide of titanium.

8. The nonaqueous electrolyte battery according to claim 7, wherein
the oxide of titanium includes lithium titanate $Li_4Ti_5O_{12}$.

9. A positive electrode comprising:
a positive electrode current collector; and
a positive electrode active material-including layer formed on the positive electrode current collector,
wherein, the positive electrode active material-including layer includes positive electrode active material particles and conductive agent particles, the positive electrode active material particles including a lithium-manganese oxide represented by $LiMn_{2-x}M_xO_4$, in which subscript x is within a range of $0.22 \leq x \leq 0.7$, and M is at least one metal element selected from a group consisting of Mg, Ti, Cr, Fe, Co, Zn, Al, and Ga, and in a particle size distribution of particles in the positive electrode active material-including layer obtained by a laser diffraction scattering method, an average particle diameter $d_{50}$ is within a range of 2 μm to 5 μm, a particle diameter $d_{10}$ at which a cumulative frequency from a small particle diameter side is 10% is within a range of 0.5 μm to 3 μm, and a particle diameter $d_{90}$ at which a cumulative frequency from the small particle diameter side is 90% is within a range of 4 μm to 10 μm, X, represented by $X=(d_{50}-d_{10})/d_{50}$, is within a range of 0.4 to 0.8, and Y, represented by $Y=(d_{90}-d_{50})/d_{90}$, is within a range of 0.2 to 0.6.

10. The positive electrode according to claim 9, wherein an amount of the positive electrode active material particles included in the positive electrode active material-including layer is 91% to less than 96% relative to a weight of the positive electrode active material-including layer.

* * * * *